US009230425B2

(12) United States Patent
Hamaue et al.

(10) Patent No.: US 9,230,425 B2
(45) Date of Patent: Jan. 5, 2016

(54) VEHICLE CONTROLLER

(71) Applicant: FUJITSU TEN LIMITED, Kobe-shi, Hyogo (JP)

(72) Inventors: Itsuki Hamaue, Kobe (JP); Yoshihiro Sasaki, Kobe (JP); Mitsuru Ohta, Kobe (JP)

(73) Assignee: FUJITSU LIMITED, Kobe (JP)

(*) Notice: Subject to any disclaimer, the term of this patent is extended or adjusted under 35 U.S.C. 154(b) by 0 days.

(21) Appl. No.: 13/851,210

(22) Filed: Mar. 27, 2013

(65) Prior Publication Data

US 2014/0107866 A1 Apr. 17, 2014

(30) Foreign Application Priority Data

Oct. 12, 2012 (JP) ................................ 2012-227218

(51) Int. Cl.
*G05D 1/00* (2006.01)
*G05D 3/00* (2006.01)
(Continued)

(52) U.S. Cl.
CPC .................................... *G08C 17/00* (2013.01)

(58) Field of Classification Search
CPC ............... G06Q 10/0833; G07C 5/008; G06K 19/0716; G06K 19/0707; H04W 4/025; H04W 4/04; H04W 4/046; H04W 4/20; H04W 4/02
See application file for complete search history.

(56) References Cited

U.S. PATENT DOCUMENTS 5,587,715 A * 12/1996 Lewis ..................... G01S 19/07 342/357.24
6,243,029 B1 6/2001 Tomer
(Continued)

FOREIGN PATENT DOCUMENTS

JP A-2004-249863 9/2004
JP A-2006-352460 12/2006
(Continued)

OTHER PUBLICATIONS

U.S. Appl. No. 13/691,000, filed Nov. 20, 2012 in the name of Satoshi Harumoto et al.
(Continued)

*Primary Examiner* — Jerrah Edwards
*Assistant Examiner* — Tommy Worden
(74) *Attorney, Agent, or Firm* — Oliff PLC

(57) ABSTRACT

A vehicle controller includes a communicator communicating with an information processor located outside the vehicle by transmitting and receiving information, a controller controlling the vehicle controller based on control information transmitted from the information processor, and a position-information-obtaining-part obtaining position information of the vehicle, wherein the position-information-obtaining-part obtains position information at a time of parking start upon parking start of the vehicle, and obtains position information at a time of reception of the control information when the controller receives the control information from the information processor while being in a sleep mode, and when the position-information-obtaining-part obtains the position information at the time of reception of the control information, the communicator transmits a more accurate one of the position information at the time of parking start and the position information at the time of reception of the control information.

11 Claims, 13 Drawing Sheets

(51) Int. Cl.
*G06F 7/00* (2006.01)
*G06F 17/00* (2006.01)
*G08C 17/00* (2006.01)

(56) References Cited

U.S. PATENT DOCUMENTS

| | | | | |
|---|---|---|---|---|
| 6,522,265 | B1 * | 2/2003 | Hillman | B60R 16/0373 340/988 |
| 7,642,897 | B2 * | 1/2010 | Karabinis | G01D 21/00 340/10.3 |
| 8,140,358 | B1 * | 3/2012 | Ling et al. | 705/4 |
| 8,279,067 | B2 * | 10/2012 | Berger | H04W 60/00 340/539.13 |
| 8,804,551 | B2 * | 8/2014 | Marshall et al. | 370/252 |
| 2006/0136131 | A1 * | 6/2006 | Dugan et al. | 701/300 |
| 2007/0008088 | A1 | 1/2007 | Nantz et al. | |
| 2007/0038338 | A1 * | 2/2007 | Larschan et al. | 701/2 |
| 2007/0050240 | A1 * | 3/2007 | Belani et al. | 705/13 |
| 2008/0057929 | A1 | 3/2008 | Min | |
| 2008/0103640 | A1 | 5/2008 | Watanabe et al. | |
| 2008/0282817 | A1 * | 11/2008 | Breed | 73/865.9 |
| 2009/0045912 | A1 | 2/2009 | Sakamoto et al. | |
| 2009/0290869 | A1 * | 11/2009 | Aono | 398/25 |
| 2009/0322510 | A1 * | 12/2009 | Berger | H04W 60/00 340/539.1 |
| 2010/0185390 | A1 * | 7/2010 | Monde | G01C 21/26 701/532 |
| 2010/0321243 | A1 * | 12/2010 | Shah | 342/451 |
| 2011/0117933 | A1 | 5/2011 | Andersson | |
| 2011/0128183 | A1 * | 6/2011 | Marshall | 342/357.29 |
| 2011/0131154 | A1 * | 6/2011 | Faber et al. | 705/418 |
| 2011/0182238 | A1 * | 7/2011 | Marshall et al. | 370/328 |
| 2011/0205017 | A1 | 8/2011 | Lazzara | |
| 2011/0244891 | A1 * | 10/2011 | Ghinamo | 455/456.6 |
| 2011/0246025 | A1 * | 10/2011 | Ishihara | 701/36 |
| 2012/0028680 | A1 * | 2/2012 | Breed | 455/556.1 |
| 2012/0053778 | A1 | 3/2012 | Colvin et al. | |
| 2012/0188101 | A1 * | 7/2012 | Ganot | 340/932.2 |
| 2012/0190386 | A1 * | 7/2012 | Anderson | 455/456.3 |
| 2012/0209634 | A1 * | 8/2012 | Ling et al. | 705/4 |
| 2012/0215442 | A1 * | 8/2012 | Sambongi | 701/472 |

FOREIGN PATENT DOCUMENTS

| | | |
|---|---|---|
| JP | A-2009-028046 | 2/2009 |
| JP | A-2010-048238 | 3/2010 |

OTHER PUBLICATIONS

U.S. Appl. No. 13/626,362, filed Sep. 25, 2012 in the name of Satoshi Harumoto et al.
Jun. 2, 2014 Office Action issued in U.S. Appl. No. 13/626,362.
Feb. 12, 2014 Office Action issued in U.S. Appl. No. 13/626,362.
Apr. 15, 2014 Office Action issued in U.S. Appl. No. 13/691,000.
Feb. 9, 2015 Office Action issued in U.S. Appl. No. 13/626,362.

* cited by examiner

PROCESSING FOR STARTING(STEP S1102)

VEHICLE CONTROLLER

BACKGROUND OF THE INVENTION

1. Field of the Invention

The invention relates to a technology that controls a vehicle by use of a mobile terminal.

2. Description of the Background Art

A remote starter that controls a driving apparatus such as an engine or a motor of user's vehicle by use of a mobile terminal is conventionally known. With this technology, a user can start the driving apparatus of user's vehicle that is away from the user. Therefore, in an example, the user can turn on an air conditioner to control the temperature in the vehicle cabin to be appropriate before the user gets in user's vehicle.

A remote operation system that operates an in-vehicle apparatus of user's vehicle via a center by use of a mobile phone as the mobile terminal is known these days. There is an application for use on the mobile terminal, which displays the parking position of user's vehicle with a distance and a direction to the vehicle after calculation. Each of the application for the remote starter and the application that displays the parking position, being in need of the position information of the vehicle, makes a request to the vehicle for transmission of the position information when the application is run. The vehicle transmits the obtained position information to the mobile terminal upon reception of the request.

The application described above is started on the parked vehicle. Thus, in many cases, the apparatus such as GPS that obtains the position information is in a sleep mode for reduction of dark current. In such a state, if the apparatus that obtains the position information is activated and executes the processing for obtaining the position information upon receiving the request for transmitting the position information, the apparatus in some cases obtains only the less-accurate position information because the apparatus just after waking up often behaves erratically. In this case, the application may be available only in a less-accurate condition, or may not be available. On the other hand, keeping the apparatus activated in stable condition is undesirable in the light of power consumption.

SUMMARY OF THE INVENTION

According to one aspect of the invention, a vehicle controller is installed in a vehicle and controls one or more operations of the vehicle. The vehicle controller includes a communicator that communicates with an information processor that is located outside the vehicle by transmitting and receiving information, a controller that controls the vehicle controller based on control information transmitted from the information processor, and a position-information-obtaining-part that obtains position information of the vehicle, wherein the position-information-obtaining-part obtains (i) position information at a time of parking start upon parking start of the vehicle, and obtains (ii) position information at a time of reception of the control information when the controller receives the control information from the information processor while the controller is in a sleep mode, and when the position-information-obtaining-part obtains the position information at the time of reception of the control information, the communicator transmits a more accurate one of (a) the position information at the time of parking start and (b) the position information at the time of reception of the control information.

According to another aspect of the invention, a vehicle controller is installed in a vehicle and controls one or more operations of the vehicle. The vehicle controller includes a communicator that communicates with an information processor that is located outside the vehicle by transmitting and receiving information, a controller that controls the vehicle controller based on control information transmitted from the information processor, and a position-information-obtaining-part that obtains position information of the vehicle, wherein the position-information-obtaining-part obtains position information at a time of parking start upon parking start of the vehicle, and the communicator transmits the position information at the time of parking start to the information processor when the controller receives the control information from the information processor while the controller is in a sleep mode. Even when the control information is received while the controller is in the sleep mode, it is possible to transmit the more accurate position information.

Therefore, the object of the invention is to provide a technology relevant to vehicle control that allows for reduction in power consumption and for transmission of more accurate position information even just after an apparatus wakes up.

These and other objects, features, aspects and advantages of the present invention will become more apparent from the following detailed description of the present invention when taken in conjunction with the accompanying drawings.

DESCRIPTION OF THE EMBODIMENTS

Hereinafter, some embodiments of the invention are described with reference to attached drawings.

<1. First Embodiment>

<1-1. Outline of System>

Figure 1:
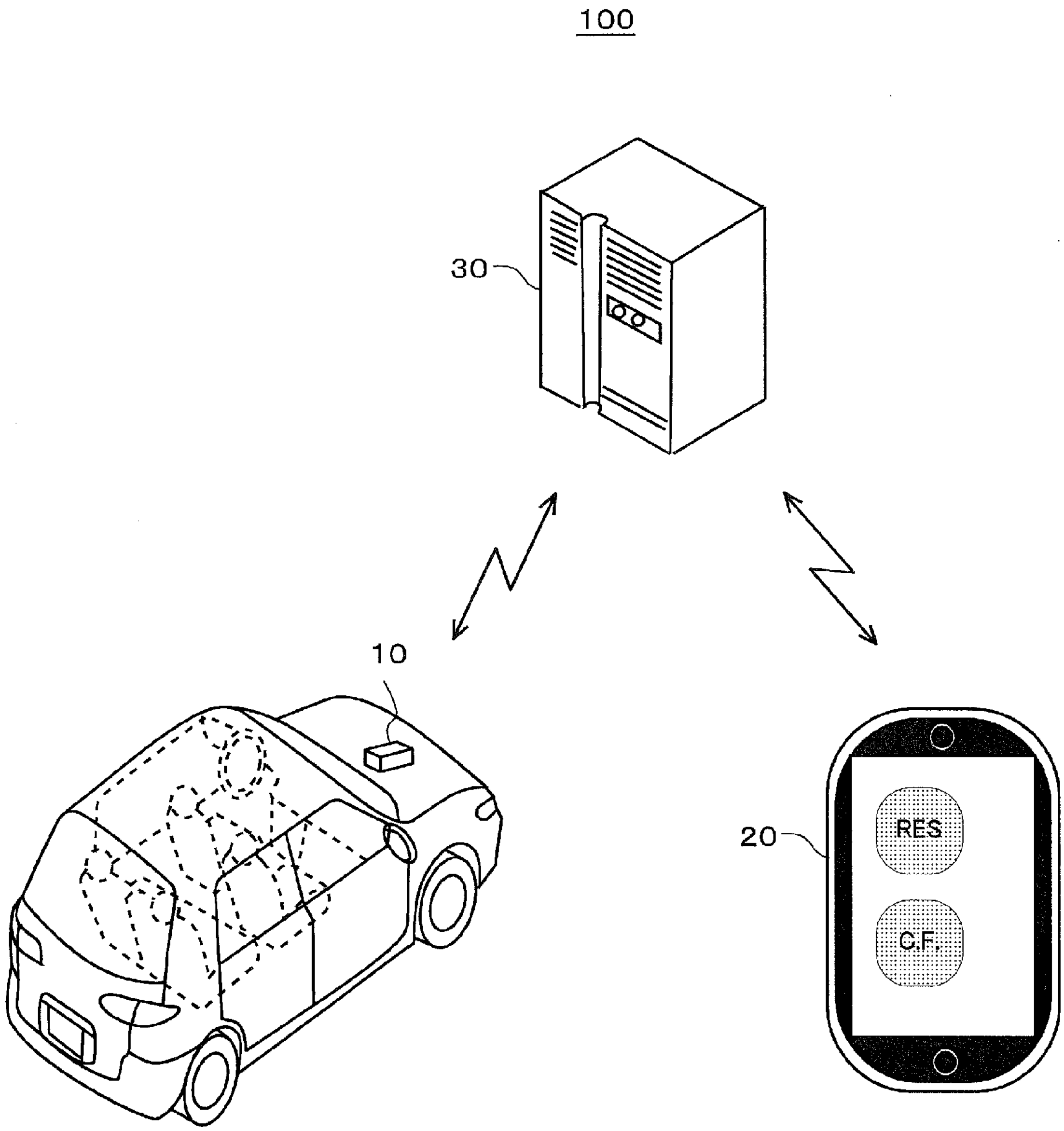
FIG. 1 shows an outline of a vehicle control system.

FIG. 1 shows an outline of a vehicle control system 100 of the embodiment. The vehicle control system 100 includes a vehicle controller 10, a mobile terminal 20 and a center 30.

The vehicle controller 10 is installed in a vehicle to control the vehicle in accordance with the control information transmitted by the center 30. The vehicle controller 10 is communicatively coupled to the center 30, and transmits the vehicle information including position information to the center 30 at a prescribed timing. In an example, the vehicle controller 10 transmits the position information at the time of parking start of the vehicle. The vehicle controller 10 also receives the control information such as a request for starting via the center 30 from the mobile terminal 20. Upon receiving the request for starting from the center 30, the vehicle controller 10 implements controls for starting a driving apparatus and various apparatuses on the vehicle.

The driving apparatus is an engine or a motor. Each of the engine and the motor can be used in the invention. However, for convenience sake, the embodiments with the engine are described. The various apparatuses are, for example, an air conditioner and a door. That is, the starting control is to control start or stop of the engine or the motor, on- or off-operation of the air conditioner, open or close of the door, and the like. Hereinafter, "driving apparatus" is used collectively as the targets to be remotely started, and "starting" is used for collective indication of the actions such as start/stop and on-/off-operation.

The mobile terminal 20 is a mobile electronic device carried by a user, for example, a smartphone, a tablet PC, a mobile phone or a PDA (Personal Digital Assistant). The mobile terminal 20 stores an application for remotely starting the driving apparatus installed on the vehicle (hereinafter, referred to as "remote-start application"). The mobile terminal 20 may store another application that displays parking position of the vehicle after identifying the exact position or that displays on the mobile terminal 20 the direction or the distance from the current position of the mobile terminal 20 to the parking position of the vehicle (hereinafter, referred to as "vehicle-position-display application"). The user can remotely make the request for starting or make various settings by executing the remote-start application stored in the mobile terminal 20. The mobile terminal 20 is communicatively coupled to the center 30, and transmits to the center 30 the request for starting and the position information of the mobile terminal 20.

The center 30 is an information processor that totally controls the vehicle control system 100. The center 30 is communicatively coupled to the vehicle controller 10 and to the mobile terminal 20, and controls the starting of the driving apparatus by transmitting and receiving the request for starting and the vehicle information mutually. In a concrete example, the center 30 receives from the vehicle the vehicle information including the position information, and also receives from the mobile terminal 20 the request for starting and the position information. Upon receiving the request for starting made by the remote-start application of the mobile terminal 20, the center 30 implements a control, such as judgment or direction on whether to implement the starting, based on the position information of the vehicle. Upon receiving from the mobile terminal 20 the login information for the vehicle-position-display application, the center 30 implements the control for transmitting the parking position information of the vehicle to the mobile terminal 20.

The vehicle control system 100 of the embodiment allows for obtaining more accurate position information of the vehicle for use in an application such as the remote-start application. Hereafter, the configuration and the processing on the vehicle control system 100 are detailed, as an example of the vehicle control system 100 that implements remote control for starting the vehicle.

<1-2. Configuration of Vehicle Controller>

Figure 2:
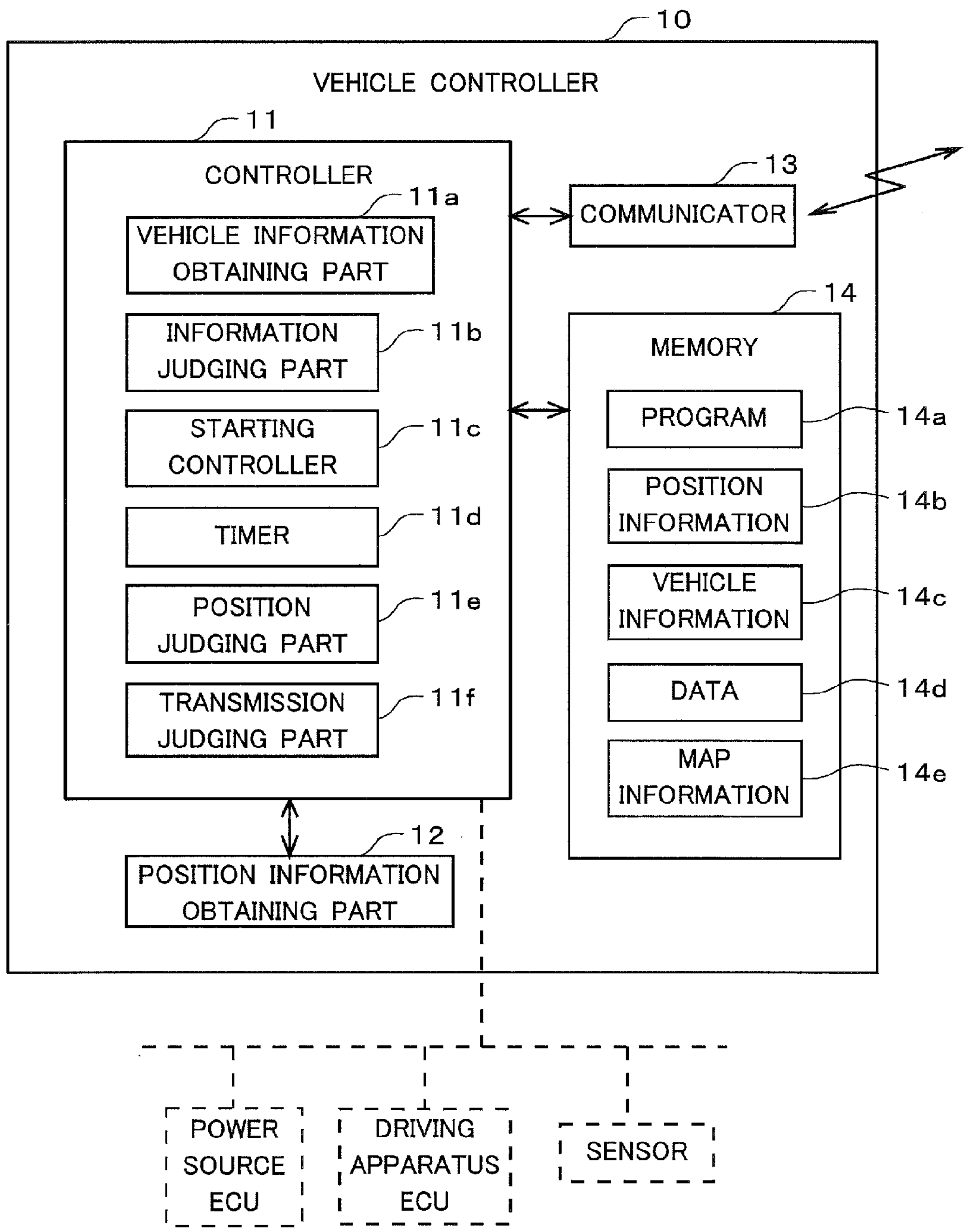
FIG. 2 shows a schematic block diagram of a vehicle controller.

First, the configuration of the vehicle controller 10 is described. FIG. 2 shows a schematic block diagram of the vehicle controller 10. As shown in FIG. 2, the vehicle controller 10 includes a controller 11, a position information obtaining part 12, a communicator 13 and a memory 14.

The controller 11 that includes a vehicle information obtaining part 11*a*, an information judging part 11*b*, a starting controller 11*c*, a timer 11*d* and a position judging part 11*e* and a transmission judging part 11*f* is a computer that has a CPU, RAM and ROM not shown in FIG. 2. The controller 11 that is connected to the communicator 13 and the memory 14 included in the vehicle controller 10 controls the whole of the vehicle controller 10 by transmitting and receiving information based on a program 14*a* stored in the memory 14. The CPU executes arithmetic processing based on the program stored in the memory 14, which provides the functions of the controller 11, such as the information judging part 11*b* and the starting controller 11*c*.

The controller 11 is communicatively coupled to other various sensors and ECUs (Electronic Control Units) installed in the vehicle via an on-vehicle LAN (Local Area Network) such as a CAN (Controller Area Network) for transmitting and receiving various types of information. Since the controller 11 is to control the overall processing on the vehicle controller 10, the controller 11 also controls the processing other than the processing executed by the vehicle information obtaining part 11*a*, the information judging part 11*b* and other parts described above.

The vehicle information obtaining part 11*a* obtains the vehicle information as the information indicating the driving conditions of the vehicle and the conditions of other ECUs. The vehicle is equipped with various sensors that detect the vehicle driving conditions, such as a vehicle velocity sensor and a steering angle sensor. The vehicle is also equipped with an engine-control-type ECU such as a fuel injection ECU, and a body-control-type ECU such as a door-lock/-unlock ECU. The vehicle information obtaining part 11*a* obtains, as the vehicle information, output via the CAN from the sensors and the ECUs.

The information judging part 11*b* judges the details of the vehicle information obtained from other sensors and the ECUs installed in the vehicle, and judges the details of the information received from the center 30. The vehicle information includes, in addition to the information described above, the information on an ignition switch being turned on or off. The information received from the center 30 includes, for example, login information for an application and the request for starting the driving apparatus.

The starting controller 11*c* controls the starting or the stop of the driving apparatus and various apparatuses that are installed in the vehicle. That is, the starting controller 11*c* transmits an applicable direction to the ECU to be controlled upon receiving the request for starting from the center 30. In an example, upon receiving from the center 30 the request for starting the driving apparatus, the starting controller 11*c* transmits the direction for starting via the CAN to the ECU that controls the driving of the driving apparatus. Upon receiving the request for starting the air conditioner, the starting controller 11*c* transmits the direction for starting via the CAN to the ECU that controls the driving of the air conditioner.

The timer 11*d* measures elapsed time. In an example, when the period of time for driving the driving apparatus by use of the remote starting function is determined in advance, the timer 11*d* measures the elapsed time from the starting, and judges whether the prescribed period of time has elapsed. In another example, the timer 11*d* measures the elapsed time after the ignition switch is turned off. The timer 11*d* is also capable of obtaining clock time, for example, the clock time at the time of starting.

The position judging part 11*e* judges whether the vehicle is parked in a restricted area. The restricted area includes a no-idling zone and a specific area. In the no-idling zone, no vehicle is allowed to be kept in the idling condition. In the specific area, it is rear that the remote starter causes the vehicle to idle. That is, the specific area is the place in which a user almost always comes back to the vehicle in a short time after getting out, such as a rest area and a parking area on an expressway, and a parking area of a convenience store. The information on these areas is included in map information 14*e* stored in the memory 14.

The position judging part 11*e* judges whether the vehicle is parked in the no-idling zone, by comparing the map information 14*e* and the parking position of the vehicle. When the position judging part 11*e* judges that the vehicle is parked in the no-idling zone, the controller 11 restricts the processing for starting the driving apparatus.

The position judging part 11*e* identifies where the specific areas are located based on road information and facility information included in the map information 14*e* stored in the memory 14, and judges whether the vehicle is parked in the specific area based on the position information of the vehicle. The user may set the specific areas on the map information 14*e* in advance. The position judging part 11*e* judges whether the vehicle is parked in the specific areas, by comparing the specific areas and the parking start position of the vehicle. When the position judging part 11*e* judges that the vehicle is parked in the specific area, the controller 11 restricts the processing for starting the driving apparatus. The user may change the setting regarding whether to restrict the processing for starting the driving apparatus when the vehicle is parked in the no-idling zone or in the specific area.

The transmission judging part 11*f* judges the position information before transmission to the center 30. When there are a plurality of position information obtained by the position information obtaining part 12, the transmission judging part 11*f* judges which is the most accurate information in order to transmit highly-reliable position information.

The position information obtaining part 12 obtains the position information indicating the current position of the vehicle controller 10. For example, a GPS (Global Positioning System) may be used as the position information obtaining part 12. The position information includes latitude information and longitude information. That is, the position information obtaining part 12 obtains the latitude information and the longitude information of the current position by use of the GPS.

The position information obtaining part 12 derives accuracy of the obtained position information. A general method is used to obtain the accuracy. The position information obtaining part 12 may derive the accuracy, for example, by a derivation method based on DOP (Dilution of Precision) dependent on the locations of GPS satellites. The position information obtaining part 12 may implement another derivation method based on RSS (Received Signal Strength) from GPS satellites or based on AOA (Angle of Arrival) of a reception signals.

The data received from a GPS satellite include the unique ID of the GPS satellite. By use of the unique IDs, the position information obtaining part 12 is capable of deriving the number of the captured GPS satellites. Thus, the position information obtaining part 12 may derive the accuracy of the obtained position information based on the number of the captured GPS satellites.

In some environments where the vehicle controller 10 is located, the position information is not available through the GPS. In this case, the position information obtaining part 12 obtains the information indicating that the position information is undetermined (hereinafter, referred to as "undetermined-information") as the information indicating that the position information is not available.

The position information indicates not only the position of the vehicle controller 10 of course but also the position of the vehicle because the obtained position information indicates the position of the vehicle controller 10 that is installed in the vehicle. Therefore, the position information and the accuracy obtained by the position information obtaining part 12 are simply referred to as "position information" hereafter. That is, the position information includes the position information including the latitude information and the longitude information obtained by the GPS, the undetermined-information when the position information is not available through the GPS, and the accuracy of the position information. The position information 14*b* is stored in the memory 14.

The communicator 13 is communicatively coupled to the center 30 for transmitting information to and receiving information from the center 30. In an example, the communicator 13 transmits the position information and the vehicle information to the center 30, and receives from the center 30 the control information, such as login information for an application or a request for starting. Communication between the vehicle controller 10 and the center 30 is through a so-called mobile telephone network. Therefore, the communicator 13 also judges whether the communicator 13 is located in a "service area" where the communication with the center is available, or in an "out-of-service area" where the communication is not available. Data 14*d* of the control information transmitted by the center 30 are stored in the memory 14.

The memory 14 stores the program 14*a*, the position information 14*b*, vehicle information 14*c*, the data 14*d* and the map information 14*e*. The memory 14 of the embodiment is nonvolatile semiconductor memory in which data reading and data writing are electrically available and that is capable of keeping data even in power-off state. For example, an EEPROM (Electrical Erasable Programmable Read-Only Memory) or a flash memory may be used as the memory 14. Other memory media or a hard disk drive including a magnetic disk may also be used. The program is so-called system software that is read out by the controller 11 for controlling the vehicle controller 10. The map information 14*e* includes road information and facility information around the country or in a prescribed wide area.

On the vehicle controller 10 of the embodiment, the memory 14 stores the map information 14*e*, and the position judging part 11*e* judges whether the vehicle is parked in the restricted area. However, the configuration is not limited to this. In an example case where the vehicle is equipped with a navigation apparatus, the map information stored in a memory of the navigation apparatus may include the information of the restricted areas. In the configuration of this case, the position judging part 11*e* obtains the information of the restricted areas from the navigation apparatus, and judges whether the vehicle is parked in the restricted area.

In the embodiment, the specific areas are specified by the vehicle controller 10. However, in another configuration, the specific areas may be specified by the center 30, and the specified specific area information may be transmitted to the vehicle controller 10.

<1-3. Configuration of Mobile Terminal>

Figure 3:
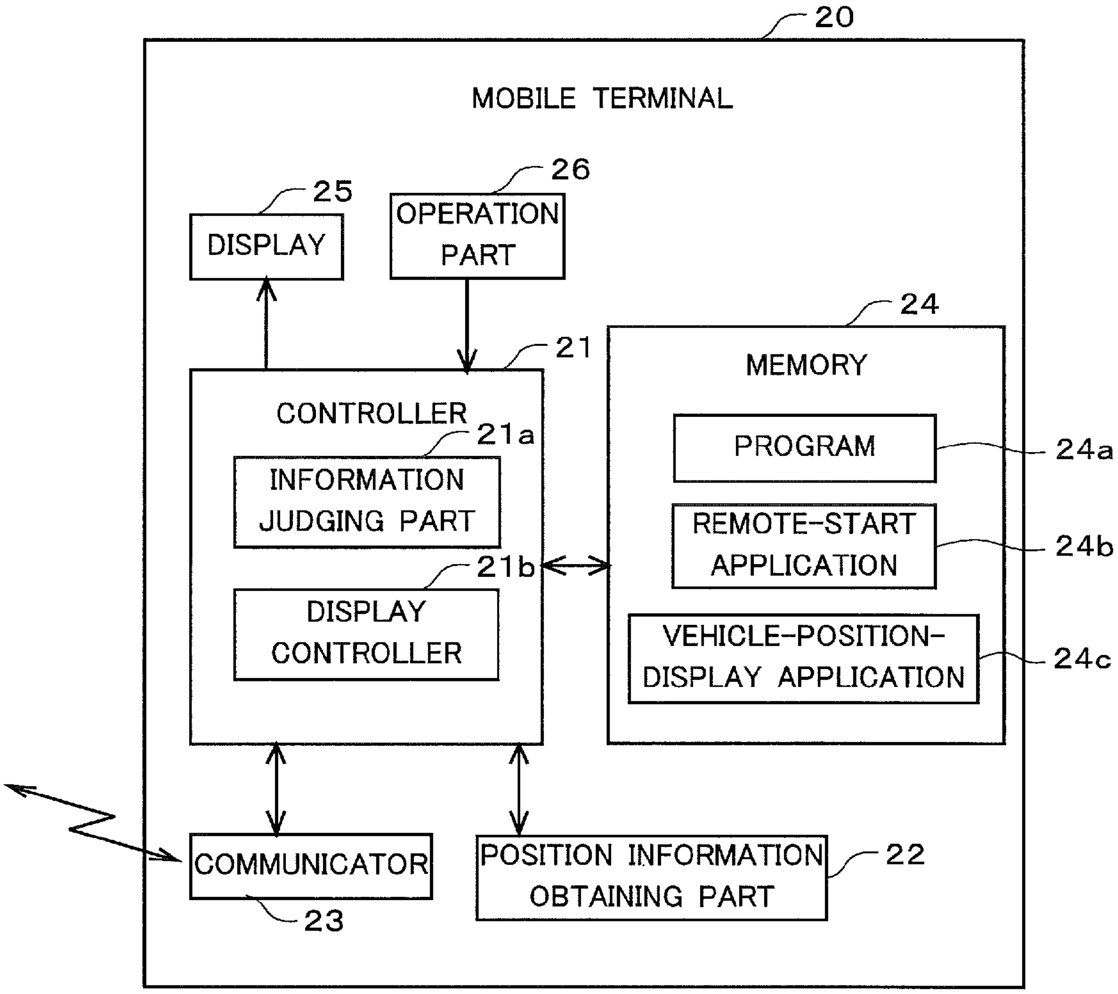
FIG. 3 shows a schematic block diagram of a mobile terminal.

Described next is the configuration of the mobile terminal 20. FIG. 3 shows a schematic block diagram of the mobile terminal 20. As shown in FIG. 3, the mobile terminal 20 includes a controller 21, a position information obtaining part 22, a communicator 23, a memory 24, a display 25 and an operation part 26.

The controller 21 that includes an information judging part 21*a* and a display controller 21*b* is a computer that has a CPU, RAM and ROM not shown in FIG. 3. The controller 21 that is connected to the communicator 23, the memory 24 and others included in the mobile terminal 20, transmits and receives information based on a program 24*a* stored in the memory 24, and controls the whole of the mobile terminal 20. The CPU executes arithmetic processing based on the program stored in the memory 24, which provides the functions of the controller 21 such as of the information judging part 21*a* and the display controller 21*b*. Since the controller 21 controls the overall processing executed on the mobile terminal 20, the controller 21 also controls the processing for executing the function of the remote-start application and other processing, in addition to the processing executed by the information judging part 21*a* and the display controller 21*b*.

The information judging part 21*a* judges the details of the obtained information. In an example, the information judging part 21*a* judges the details of the information received from the center 30, and judges the details of the information entered via the operation part 26 of the mobile terminal 20. The information received from the center 30 includes, for example, an inquiry relevant to the vehicle information and an inquiry on whether to implement the starting. The information entered via the operation part 26 of the mobile terminal 20 includes, for example, login information for an application and a request for starting the driving apparatus.

The display controller 21*b* makes control so as to display an image on the display 25 of the mobile terminal 20. Concretely, the display controller 21*b* makes control to display on the display 25 an operation screen for the remote-start application or for the vehicle-position-display application, or a check screen received from the center 30.

The position information obtaining part 22 obtains the position information indicating the current position of the mobile terminal 20. For example, a GPS may be used as the position information obtaining part 22. The position information of the mobile terminal 20 includes latitude information and longitude information. The obtained position information of the mobile terminal 20 may be stored in the memory 24.

The communicator 23 is communicatively coupled to the center 30 for transmitting information to and receiving information from the center 30. In an example, the communicator 23 transmits to the center 30 the login information for the application or the request for starting, and receives from the center 30 an inquiry on whether to implement the starting. Communication between the mobile terminal 20 and the center 30 is through the so-called mobile telephone network. Therefore, the communicator 23 also judges whether the communicator 23 is located in "service area" where the communication with the center 30 is available, or in "out-of-service area" where the communication is not available.

The memory 24 stores the program 24*a*, remote-start application 24*b*, and vehicle-position-display application 24*c*. The memory 24 of the embodiment is nonvolatile semiconductor memory in which data reading and data writing are electrically available and that is capable of keeping data even in power-off state. For example, an EEPROM or a flash memory may be used as the memory 24. However, other memory media or a hard disk drive including a magnetic disk may be used. The program 24*a* is so-called system software that is read out by the controller 21 for controlling the mobile terminal 20. The remote-start application 24*b* is a control program for remote starting. The vehicle-position-display application 24*c* is a control program for vehicle position display.

The display 25 displays the operation screen of the remote-start application 24*b* or the vehicle-position-display application 24*c*, or the check screen on which a user checks the vehicle information transmitted by the center 30. For example, a liquid crystal display or an organic EL display may be used as the display 25.

The operation part 26 is an information input apparatus including a mechanical button and a touch panel. The user can make various operations relevant to the control of the remote starting, and can set and change the setting information by operating the operation part 26. The operation part 26 may be configured as a unit of the display 25.

Figure 4:
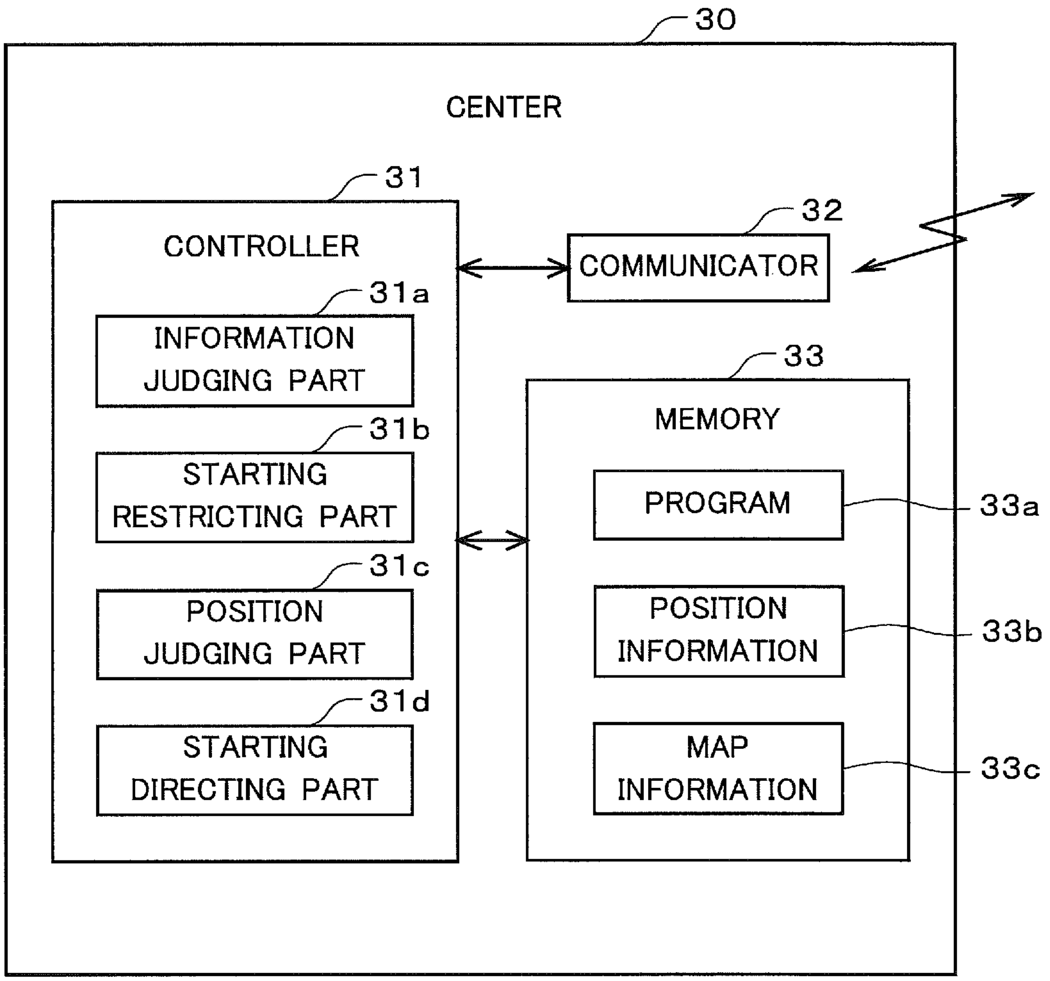
FIG. 4 shows a schematic block diagram of a center.

<1-4. Configuration of Center>Next, the configuration of the center 30 is described. FIG. 4 shows a schematic block diagram of the center 30. As shown in FIG. 4, the center 30 includes a controller 31, a communicator 32 and a memory 33.

The controller 31 that includes an information judging part 31*a*, a starting restricting part 31*b*, a position judging part 31*c* and a starting directing part 31*d*, is a computer that has a CPU, RAM and ROM not shown in FIG. 4. The controller 31 that is connected to the communicator 32, the memory 33 and others that are included in the center 30, transmits and receives information based on the program stored in the memory 33, and controls the whole of the center 30. The CPU executes arithmetic processing based on a program 33*a* stored in the memory 33, which provides the functions of the controller 31, such as the information judging part 31*a* and the starting restricting part 31*b*. Since the controller 31 controls the overall processing on the center 30, the controller 31 also controls the processing other than the processing executed by the information judging part 31*a*, the starting restricting part 31*b*, the position judging part 31*c* and the starting directing part 31*d*.

The information judging part 31*a* judges the details of the information received from the vehicle controller 10 or the mobile terminal 20. Concretely, the information judging part 31*a* judges whether the information received from the vehicle controller 10 is the position information, the information indicating the driving apparatus has been started, or the information on the ignition switch being turned on or off. The information judging part 31*a* also judges whether the information received from the mobile terminal 20 is the login information for the application, the request for starting or stopping the driving apparatus, or other information.

Upon reception of the request for starting from the mobile terminal 20, the starting restricting part 31*b* judges whether to restrict the starting of the driving apparatus based on the position information. In an example, when whether to restrict the starting of the driving apparatus is decided based on the difference between the vehicle position at the time of parking start and the vehicle position at the time of the application logged in, the starting restricting part 31*b* judges whether to restrict the starting of the driving apparatus based on the position information at the time of parking start and the position information at the time of the application logged in.

Concretely, the starting restricting part 31*b* judges the difference between the position information at the time of the ignition switch being turned off (the position information at the time of parking start) which has been read out from the memory 33, and the position information that has been obtained from the vehicle controller 10 when receiving the login information for the application from the mobile terminal 20 (the position information at the time of login), by comparing them. Then, the starting restricting part 31*b* reads out from the memory 33 the restriction conditions (not indicated in FIG. 4), and compares the read-out restriction conditions and the result of the judged difference. The restriction conditions are for restricting the starting, for example, when the two of the position information are different.

Under this condition, upon the judgment that the two of the position information are different, the starting restricting part 31*b* restricts the processing for starting. That is, the judgment that the two of the position information are different indicates that the vehicle has moved from the position at the time of parking start. The assumed factor of the vehicle having moved is that the vehicle has been stolen or towed away. Therefore, when the two of the position information are different, the starting restricting part 31*b* forbids the starting or restricts the starting such as by confirming with the user whether to continue the processing for starting.

Upon reception of the login information for the application from the mobile terminal 20, the position judging part 31*c* judges whether the vehicle is parked in the no-idling zone. In the no-idling zone, no vehicle is allowed to be kept in the idling condition, as described above. The information on the no-idling zones is included in map information 33*c* stored in the memory 33. The position judging part 31*c* judges whether the vehicle is parked in the no-idling zone by comparing the obtained position information and the map information 33*c* When judging that the vehicle is parked in the no-idling zone, the position judging part 31*c* does not execute the processing for starting.

The position judging part 31*c* also judges whether the vehicle is parked in the specific area. In the specific area, it is rear that a user makes the vehicle idle through remote starting. That is, the specific area also includes the place in which a user almost always comes back to the vehicle in a short time after getting out, such as a rest area and a parking area on an expressway, and a parking area of a convenience store, as described above.

The position judging part 31*c* identifies where the specific areas are located based on the road information and the facility information of the map information 33*c* stored in the memory 33, and judges whether the vehicle is parked in the specific area based on the position information. The user may set the specific areas on the map information 33*c* in advance. The position judging part 31*c* restricts the processing for starting when judging that the vehicle is parked in the specific area, and continues the processing for starting when judging that the vehicle is not parked in the specific areas.

The starting directing part 31*d* makes the final decision on whether to execute the remote starting function based on the judgment results made by the starting restricting part 31*b* and the position judging part 31*c*, and executes the processing for transmitting the request for starting to the vehicle controller 10. Concretely, upon the reception of the request for starting from the mobile terminal 20, each of the starting restricting part 31*b* and the position judging part 31*c* judges whether to continue the processing for starting. When the both of them judge that the processing for starting is to be continued, the starting directing part 31*d* makes the final decision to execute the remote starting, and transmits the request for starting to the vehicle controller 10 via the communicator 32.

The communicator 32 is configured to be communicatively coupled to the vehicle controller 10 and to the mobile terminal 20 to transmit and receive information mutually. In an example, the communicator 32 transmits to the vehicle controller 10 the control information such as the login information for the application and the request for starting, and transmits to the mobile terminal 20 the information for confirming whether to continue the processing for starting. In another example, the communicator 32 receives from the vehicle controller 10 the position information and the vehicle information, and receives from the mobile terminal 20 the login information for the application and the request for starting. Communications with the vehicle controller 10 and with the mobile terminal 20 are through the so-called mobile telephone network.

The memory 33 stores the program 33*a*, position information 33*b* and the map information 33*c*. The memory 33 is nonvolatile semiconductor memory in which data reading and data writing are electrically available and that is capable of keeping data even in power-off state. For example, an EEPROM or a flash memory may be used as the memory 33. However, other memory media or a hard disk drive including a magnetic disk may be used. The program 33*a* is so-called system software read out by the controller 31 for controlling the center 30. The position information 33*b* includes the both or one of the position information at the time of parking start and the position information at the time of login. The map information 33*c* includes the road information and the facility information around the country or in a prescribed wide area.

<1-5. Processing on Vehicle Controller>

Figure 5:
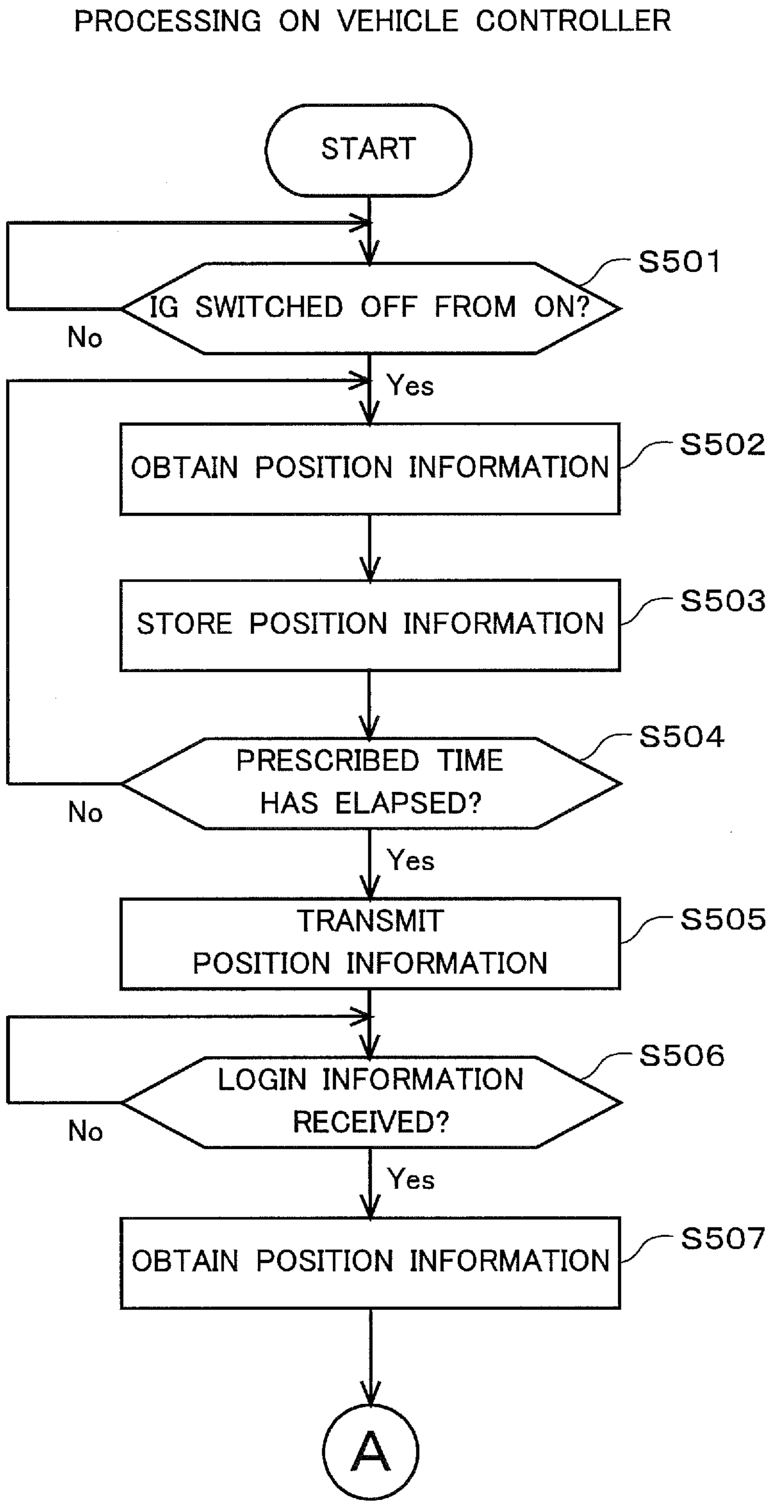
FIG. 5 shows a flowchart of processing on the vehicle controller.
Figure 6:
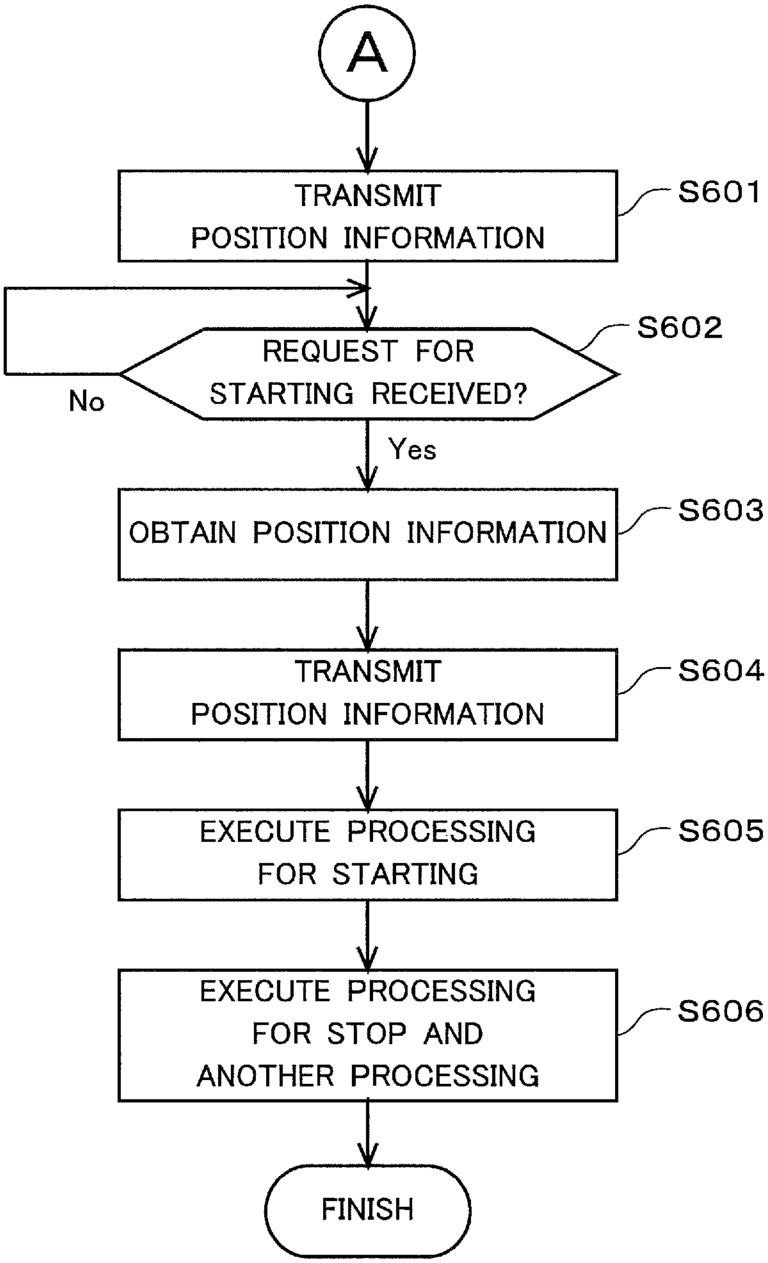
FIG. 6 shows another flowchart of the processing on the vehicle controller.

Next, the processing on the vehicle controller 10 is described. Each of FIG. 5 and FIG. 6 shows the flowchart of the processing on the vehicle controller 10. While the processing in the case of the remote-start application 24*b* used is described, the processing in the case of the vehicle-position-display application 24*c* used is the same.

The vehicle controller 10 obtains the position information periodically while the ignition switch of the vehicle is in an on-state, and also obtains the position information at a prescribed timing when the ignition switch is in an off-state. The processing for remote starting is executed when the ignition switch of the vehicle is in the off-state. Therefore, in the embodiment, the processing on the vehicle controller 10 when the ignition switch is in the off-state is mainly described.

First, while the ignition switch is in the on-state, the vehicle information obtaining part 11*a* detects whether the ignition switch has been turned off (step S501). Concretely, while the ignition switch is in the on-state, upon reception via CAN from a power source ECU, of the signal indicating that the ignition switch is in the off-state, the vehicle information obtaining part 11*a* detects that the ignition switch has been turned off from the on-state. In the drawings, the ignition switch is indicated as "IG."

When not detecting that the ignition switch has been turned off (No at the step S501), the vehicle information obtaining part 11*a* periodically detects whether the ignition switch has been turned off. When the vehicle information obtaining part 11*a* detects that the ignition switch has been turned off (Yes at the step S501), the controller 11 obtains the position information from the position information obtaining part 12 (step S502).

When obtaining the position information from the position information obtaining part 12, the controller 11 stores the obtained position information in the memory 14 (step S503). As described above, the position information includes the accuracy of the position information, as well as the latitude information and the longitude information. Thus, when the position information is already stored in the memory 14, the controller 11 compares the accuracy of the newly-obtained position information and the accuracy of the stored position information, and stores the more accurate position information in the memory 14.

When the newly-obtained position information is more accurate than the stored position information, the controller 11 overwrites the position information with the newly-obtained position information for storage. On the other hand, when the stored position information is more accurate than the newly-obtained position information, the controller 11 deletes the newly-obtained position information without storage. When there is no position information in the memory 14, the controller 11 stores the newly-obtained position information.

Then, the timer 11*d* judges whether the prescribed period of time has elapsed since the ignition switch has been turned off (step S504). When the prescribed period of time elapses since the ignition switch has been turned off, the controller 11 turns into a sleep mode, and the position information obtaining part 12 also turns into a sleep mode. Just before turning into the sleep mode, the controller 11 transmits the position information to the center 30. Treating the period of time just before turning into the sleep mode as the prescribed period of time, the timer 11*d* judges whether the prescribed period of time has elapsed.

When the prescribed period of time has not elapsed (No at the step S504), the position information obtaining part 12 re-executes the processing for obtaining the position information (step S502). When the prescribed period of time has elapsed (Yes at the step S504), the controller 11 transmits the position information stored in the memory 14 to the center 30 without re-execution of the processing for obtaining the position information (step S505). That is, the controller 11 transmits to the center 30 the most accurate position information among the position information obtained until the prescribed period of time has elapsed since the ignition switch has been turned off. The position information transmitted at this step is treated as the position information at the time of parking start. Then, the controller 11 turns into the sleep mode.

After turning into the sleep mode, the controller 11 monitors whether the login information has been received (step S506). That is, the controller 11 monitors whether the controller 11 has received the login information entered by a user for executing the remote-start application 24*b* stored in the mobile terminal 20. Concretely, when the controller 11 receives the control information such as the login information from the center 30 while being in the sleep mode, the reception triggers waking the controller 11 up from the sleep mode and restart of a program. After that, the controller 11 judges whether the login information has been received by checking the received control information. Or when turning into the wakeup mode upon receiving the control information from the center 30, the controller 11 may judge that the login information has been received.

When not receiving the login information (No at the step S506), the controller 11 keeps monitoring the reception in the sleep mode. On the other hand, upon reception of the login information, the controller 11 wakes up from the sleep mode. When the controller 11 judges that the login information has been received (Yes at the step S506), the position information obtaining part 12 obtains the position information (step S507) because it is highly possible that remote starting is requested, and the procedure moves to the next step (A in FIG. 5). The position information obtained at this step is the position information at the time of login.

Next, the controller 11 executes the processing for transmitting the position information to the center 30 (step S601). The position information to be transmitted at this step is either the newly-obtained position information at the time of login, or the position information at the time of parking start which is stored in the memory 14 and which has been obtained at the repeated steps from the step S502 to the step S504 while the ignition switch has been in the off-state. Just after the controller 11 has woken up from the sleep mode, the position information obtaining part 12 also wakes up but often behaves erratically. The position information obtained in such a case is less accurate and less reliable. Therefore, in the processing, the highly-reliable position information is selected for transmission after comparison among a plurality of position information.

That is, the controller 11 compares the position information at the time of parking start and the position information at the time of login, and transmits to the center 30 the more accurate position information. When the position information at the time of login is more accurate than the position information at the time of parking start, the controller 11 overwrites for storage the position information stored in the memory 14 with the position information at the time of login.

Next, the controller 11 judges whether the request for starting has been received from the center 30 (step S602). Concretely, the information judging part 11*b* judges whether the data received from the center 30 include the request for starting the driving apparatus. When judging that the request for starting has not been received (No at the step S602), the controller 11 re-judges whether the request for starting has been received. When the controller 11 judges that the request for starting has been received (Yes at the step S602), the position information obtaining part 12 obtains the position information (step S603). The position information obtained at this step is the position information at the time of request for starting.

Next, the controller 11 executes the processing for transmitting the position information to the center 30 (step S604). Concretely, the controller 11 first judges whether the error in GPS positioning measurement of the position information at the time of request for starting is within a prescribed value. Next, when the error in positioning measurement is within the prescribed value, the controller 11 transmits to the center 30 the position information at the time of the request for starting. When the error exceeds the prescribed value, the controller 11 transmits the position information stored in the memory 14. The prescribed value may be decided within a tolerable error range, for example, 70 meters. The error in positioning measurement can be derived based on the position information.

Then, the starting controller 11*c* executes the processing for starting the driving apparatus (step S605). Concretely, upon reception of the request for starting, the starting controller 11*c* transmits a signal for starting via CAN to the power source ECU. The power source ECU turns on each of an ACC relay, an ignition switch relay and a starter relay, and transmits an ACC signal, an ignition signal and a starter signal to an engine ECU. Upon reception of these signals, the engine ECU starts a starter motor to start an engine. This enables remote control to start the engine. In the case of the vehicle equipped with a so-called immobilizer, the starting controller 11*c* executes the processing for certification with the ECU that controls the immobilizer.

After executing the processing for starting the driving apparatus based on the request for starting, the controller 11 may transmit to the center 30 via the communicator 13 the information indicating that the processing for starting has been executed.

Next, when receiving from the center 30 the request for stopping the driving apparatus or another processing request, the controller 11 executes the processing for stopping the driving apparatus or the requested processing (step S606). In an example of the processing for stop, the starting controller 11*c* transmits the signal for stop to the power source ECU via the CAN, and the power source ECU turns off each of the ACC relay, the ignition relay and the starter relay to stop the engine drive.

Another processing request is the one other than the request for starting and stopping the driving apparatus. When such a request is received, the starting controller 11*c* executes the processing applicable to the requested processing. In an example, when the request for door lock is received, the starting controller 11*c* executes the processing for locking the doors. When the request for door unlock is received, the starting controller 11*c* executes the processing for unlocking the doors. When the request for transmitting the vehicle information is received, the starting controller 11*c* executes the processing for transmitting the requested vehicle information to the center 30 via the communicator 13. Then, the processing on the vehicle controller 10 is finished.

Figure 7:
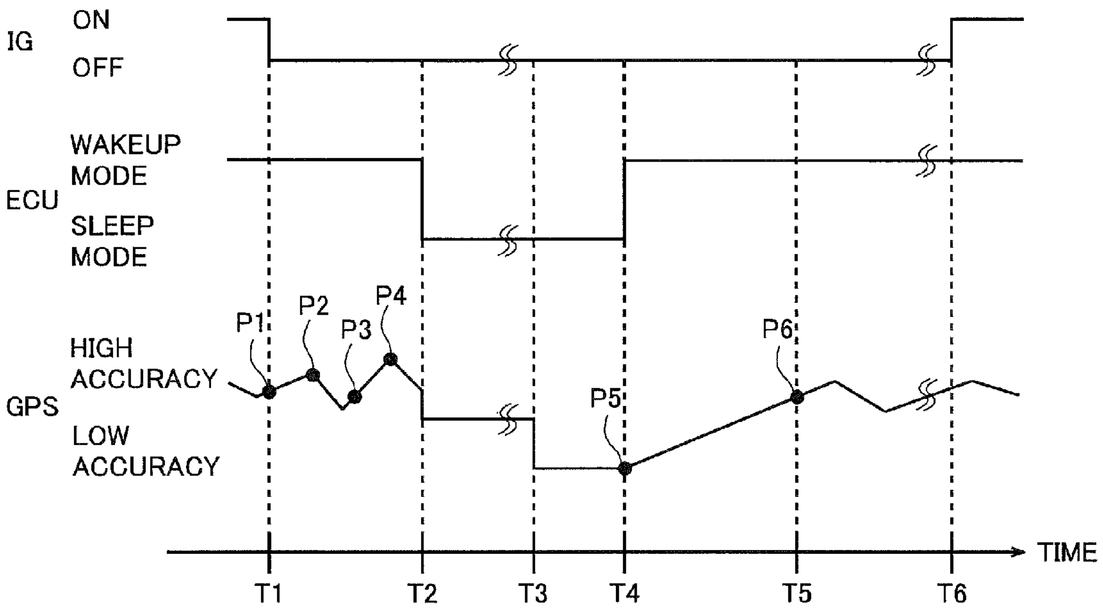
FIG. 7 shows a time chart indicating the processing on the vehicle controller.

Described next referring to another drawing is the processing for obtaining and transmitting the position information executed since the ignition switch has been turned off until it is turned on. FIG. 7 shows the time chart indicating the processing for obtaining and transmitting the position information while the ignition switch is in the off-state. In FIG. 7, IG shows the state of the ignition. ECU shows the state of the controller 11. GPS shows the accuracy of the position information obtained by the position information obtaining part 12.

As shown in FIG. 7, when the ignition switch is turned off at a time T1, the position information obtaining part 12 obtains position information P1. Since there is no position information in the memory 14, the controller 11 stores the position information P1 in the memory 14. The controller 11 executes the processing for obtaining the position information at the next timing that comes before the prescribed period of time elapses. The position information obtaining part 12 obtains position information P2 at the next timing for obtaining the position information.

In this case, since the position information P1 is already stored in the memory 14, the controller 11 judges which is more accurate between the position information P2 and the position information P1. In the example shown in FIG. 7, the controller 11 judges that the position information P2 is more accurate. Thus, the controller 11 overwrites the position information with the position information P2 in the memory 14 for storage.

In this way, the controller 11 repeats the processing for obtaining the position information and the processing for storing the position information until the prescribed period of time elapses. In the example shown in FIG. 7, the controller 11 obtains position information P3 and position information P4 after that. The position information P3 is not stored due to its lower accuracy. The position information P4 is stored in the memory 14 because the position information P4 is more accurate than the position information P2.

After the controller 11 obtains the position information P4, the prescribed period of time will elapse before the arrival of the next timing for obtaining the position information. Before turning into the sleep mode after the prescribed period of time elapses, the controller 11 executes the processing for transmitting to the center 30 the position information P4 stored in the memory 14. The position information P4 transmitted at this step is the position information at the time of parking start. The interval for obtaining the position information may be set appropriately, for example, 1 second.

After that, the controller 11 turns into the sleep mode at a time T2. In connection with this, the position information obtaining part 12 also starts the processing for turning into the sleep mode. Concretely, the position information obtaining part 12 monitors whether the position information obtaining part 12 is able to keep capturing the GPS satellites that have been first captured when the position information P4 has been obtained. The interval for monitoring may be set appropriately, for example, 10 seconds. When the number of the GPS satellites that have been captured when the position information P4 has been obtained and that are still captured decreases below a prescribed number, the position information obtaining part 12 finishes capturing the GPS satellites, and turns into the sleep mode until next time the login information of the remote-start application is received (time T3 to time T4).

When the position information obtaining part 12 receives the login information from the center 30 at the time T4 while being in the sleep mode, both of the controller 11 and the position information obtaining part 12 wake up. The position information obtaining part 12 obtains position information P5 after waking up. The position information P5 is the position information obtained at the time of login.

Then, the controller 11 executes the processing for transmitting the position information to the center. The position information transmitted at this step is the more accurate position information, either the position information at the time of parking start or the position information at the time of login. After the position information obtaining part 12 wakes up, the accuracy of the position information is upgrading gradually as time passes. However, the accuracy of the position information at the time of login may be less accurate because the position information obtaining part 12 often behaves erratically just after waking up. Thus, in some cases, the position information at the time of login is not worth the transmission.

Upon reception of the request for starting from the center 30 at the time T5, the controller 11 obtains position information P6. Then, the controller 11 derives the error in positioning measurement of the position information P6, and compares the derived error and the prescribed value set in advance. When the derived error in positioning measurement is smaller than the prescribed value (that is, when it is more accurate), the controller 11 transmits the position information P6 to the center 30. When the derived error in positioning measurement is larger than the prescribed value (that is, when it is less accurate), the controller 11 transmits to the center 30 the position information stored in the memory 14.

The processing may be executed based on the comparison between the prescribed accuracy and the accuracy of the position information P6 derived from the error in positioning measurement, instead of the comparison between the error in positioning measurement and the prescribed value. That is, when the derived accuracy is higher than the prescribed accuracy, the controller 11 transmits the position information P6 to the center 30. When the derived accuracy is lower than the prescribed accuracy, the controller 11 transmits to the center 30 the position information stored in the memory 14.

After that, through the processing for starting the driving apparatus based on the request for starting, the ignition switch is turned on (time T6). When the ignition switch is turned on, the position information stored in the memory 14 is reset (deleted).

As above, the position information obtaining part 12 obtains the position information until just before turning into the sleep mode, and the most accurate position information among a plurality of the obtained position information is stored. This enables transmission of the highly-reliable position information when required, even while the controller 11 behaves erratically just after waking up.

<1-6. Processing on Mobile Terminal>

Figure 8:
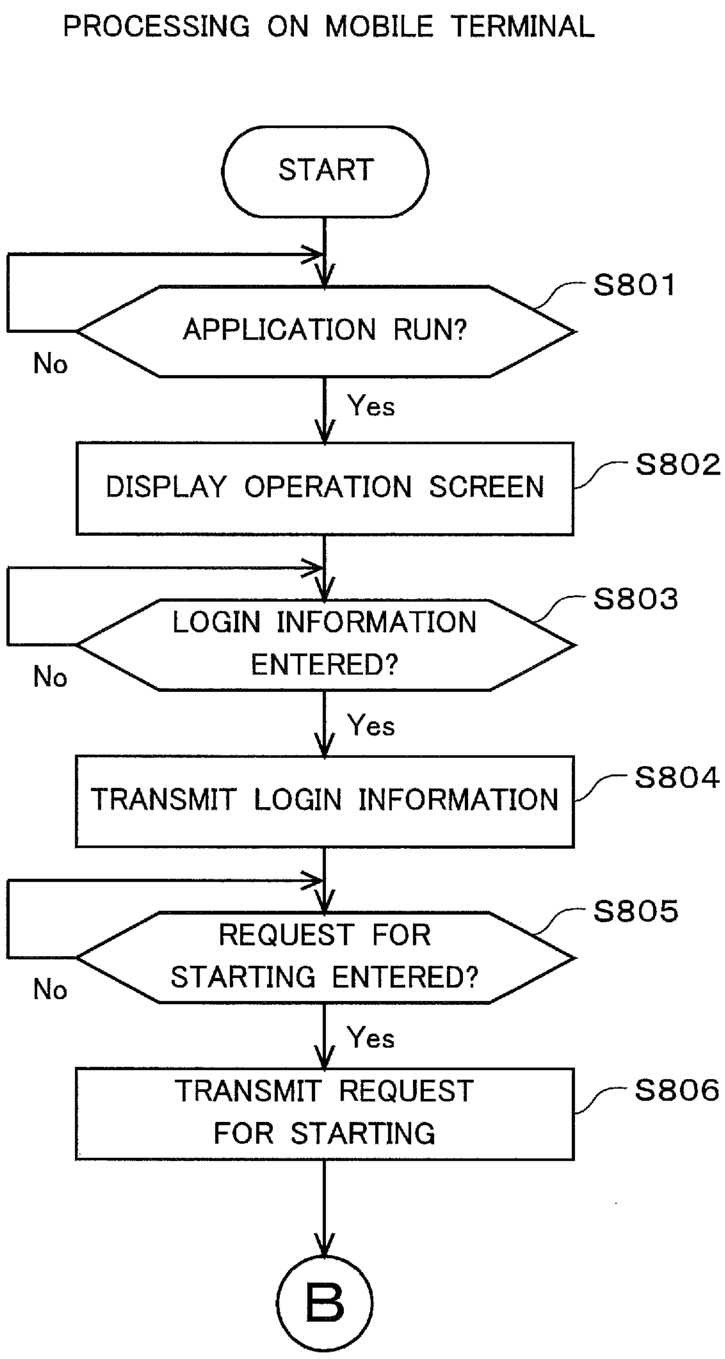
FIG. 8 shows a flowchart of processing on the mobile terminal.
Figure 9:
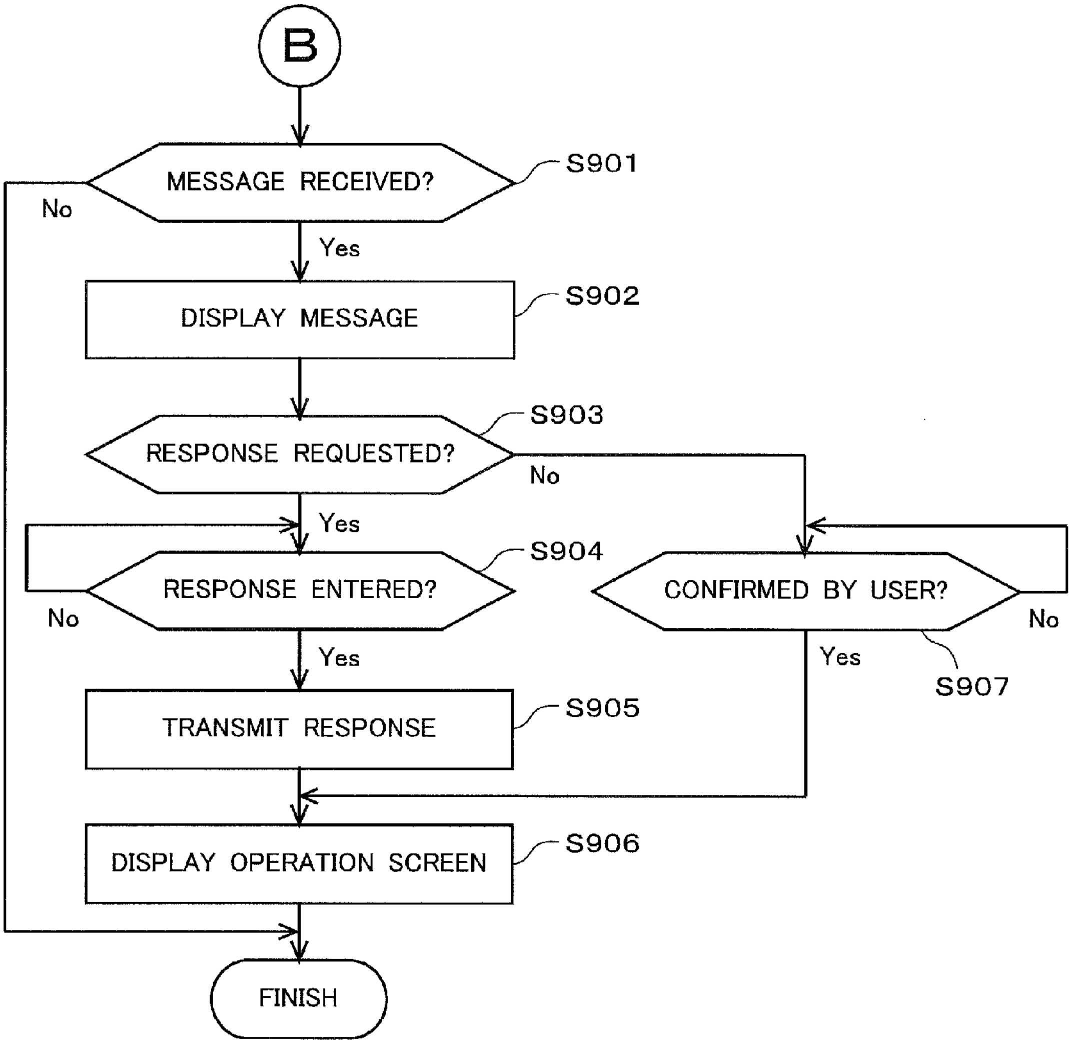
FIG. 9 shows another flowchart of the processing on the mobile terminal.

Next, the processing on the mobile terminal 20 is described. Each of FIG. 8 and FIG. 9 shows a flowchart of the processing on the mobile terminal 20. In the embodiment, the processing for remote starting by use of the mobile terminal 20 is described.

First, the mobile terminal 20 judges whether the remote-start application 24*b* is run (step S801). When the remote-start application 24*b* is not run (No at the step S801), the mobile terminal 20 monitors the running. When the remote-start application 24*b* is run (Yes at the step S801), a main operation screen for remote-start operation is displayed on the display 25 (step S802). The display controller 21*b* reads out the operation screen stored in the remote-start application 24*b*, and displays the operation screen on the display 25.

Next, the controller 21 judges whether a user has entered the login information for the remote-start application 24*b* on the displayed operation screen (step S803). When the login information is not entered (No at the step S803), the controller 21 monitors the input again. When the login information is entered (Yes at the step S803), the controller 21 transmits the entered login information to the center 30 (step S804).

Next, the controller 21 judges whether a user has entered the request for starting on the displayed operation screen (step S805). When the request for starting is not entered (No at the step S805), the controller 21 monitors the input again. When the request for starting is entered (Yes at the step S805), the controller 21 transmits the entered request for starting to the center 30 (step S806), and the procedure moves to the next step (B in FIG. 8).

Next, the controller 21 judges whether any message has been received from the center 30 (step S901). The judgment made by the controller 21 includes the judgment on whether any data have been received from the center 30, and whether the received data, if any, correspond to a message. Concretely, the judgment on whether the received data correspond to a message is made by the information judging part 21*a*. The messages to be received from the center 30 are, for example, a confirmation message relevant to continuation of the processing for remote starting, and a response message to the information requested by the user to the center. The concrete examples of these messages are the confirmation message for confirming whether to continue the starting in the case where the restriction conditions for the restriction function described later are not satisfied, and the response message for transmitting the details of the vehicle information that has been inquired by the user to the center.

When the controller 21 judges that any message has not been received (No at the step S901), the processing for remote starting is finished without execution of the following steps. When judging that a message has been received (Yes at the step S901), the controller 21 displays the relevant message on the display 25 (step S902).

The information judging part 21*a* judges whether the received message is for requesting user's response (step S903). The message for requesting user's response is, in the examples described above, the confirmation message for confirming whether to continue the starting. The message not for requesting user's response is the message for transmitting the details of the vehicle information.

When the information judging part 21*a* judges that the received message is for requesting user's response (Yes at the step S903), the controller 21 monitors whether user's response has been entered (step S904). The response is entered when the user makes operations on the operation screen. The step for monitoring the user's response is repeated until when it is judged that the response has been entered (No at the step S904).

When judging that the response has been entered (Yes at the step S904), the controller 21 transmits the details of the response to the center via the communicator 23 (step S905). Then, the controller 21 redisplays the operation screen on the display (step S906).

When the information judging part 21*a* judges that the received message is not for requesting the user's response at the step for judging the existence of the response request (No at the step S903), the controller 21 monitors whether the user has confirmed the displayed message (step S907). The message not for requesting user's response is only for presenting the details to the user. Thus, the controller 21 monitors simply whether the user has confirmed the message. However, the step for monitoring if not needed may be omitted.

The controller 21 repeats the step for monitoring until it is judged that the user has confirmed the message (No at the step S907). When judging that the user has confirmed the message (Yes at the step S907), the controller 21 redisplays the operation screen on the display (step S906). In an example, the user touches a confirmation button on the operation screen to express confirmation of the message. In this case, the controller 21 judges whether the message has been confirmed by judging whether the confirmation button has been touched.

Later, the user can execute again the processing for remote starting by re-executing the processing from the start. The user can complete the processing for remote starting by shutting down the remote-start application 24*b*.

The communication with the center 30 is terminated not just when the remote-start application 24*b* is shut down, but is automatically terminated when transmitting necessary data to and receiving necessary data from the center 30 are completed.

<1-7. Processing on Center>

Next, the processing on the center 30 is described. Each of FIG. 10, FIG. 11, FIG. 12 and FIG. 13 shows a flowchart of the processing on the center 30. Described in the embodiment is the processing for remote starting on the center 30 by communicating with the vehicle controller 10 and with the mobile terminal 20 for transmitting and receiving information.

First, the controller 31 judges whether any data have been received from the vehicle controller 10 (step S1001). Concretely, the controller 31 judges whether any data have been received via the communicator 32, or whether the sender of the data, if any, is the vehicle controller 10. When the controller 31 judges that any data have not been received from the vehicle controller 10 (No at the step S1001), the procedure moves to the step for judging whether any data have been received from the mobile terminal 20 (step S1004).

When the controller 31 judges that data have been received from the vehicle controller 10 (Yes at the step S1001), the information judging part 31*a* judges whether the received data include the position information obtained when the ignition switch has been turned off, that is the position information at the time of parking start (step S1002). When the information judging part 31*a* judges that the received data do not include the position information at the time of parking start (No at the step S1002), the procedure moves to the step for judging whether any data have been received from the mobile terminal 20 (step S1004).

When the information judging part 31*a* judges that the received data include the position information at the time of parking start (Yes at the step S1002), the controller 31 stores the position information at the time of parking start in the memory 33 (step S1003).

Next, the controller 31 judges whether any data have been received from the mobile terminal 20 (step S1004). Concretely, the controller 31 judges whether any data have been received via the communicator 32, or whether the sender of the data, if any, is the mobile terminal 20. When the controller 31 judges that any data have not been received from the mobile terminal 20 (No at the step S1004), the processing for remote starting on the center 30 is finished (C in FIG. 10).

When the controller 31 judges that data have been received from the mobile terminal 20 (Yes at the step S1004), the information judging part 31*a* judges whether the received data include the login information (step S1005). When the information judging part 31*a* judges that the received data do not include the login information (No at the step S1005), the procedure moves to the next step (D in FIG. 10). When the information judging part 31 a judges that the received data include the login information (Yes at the step S1005), the controller 31 transmits the login information to the vehicle controller 10 (step S1006).

Figure 10:
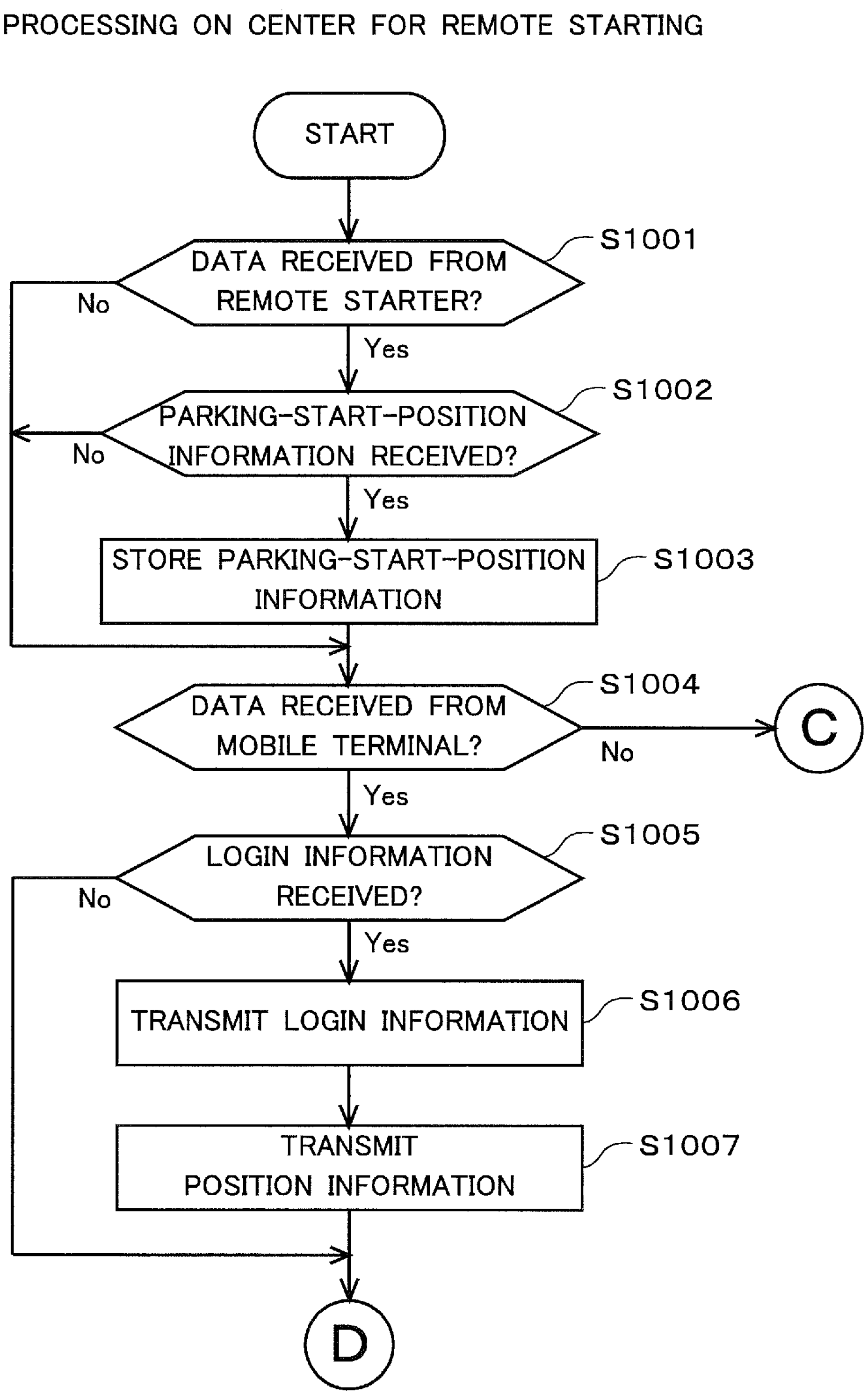
FIG. 10 shows a flowchart of processing on the center.
Figure 11:
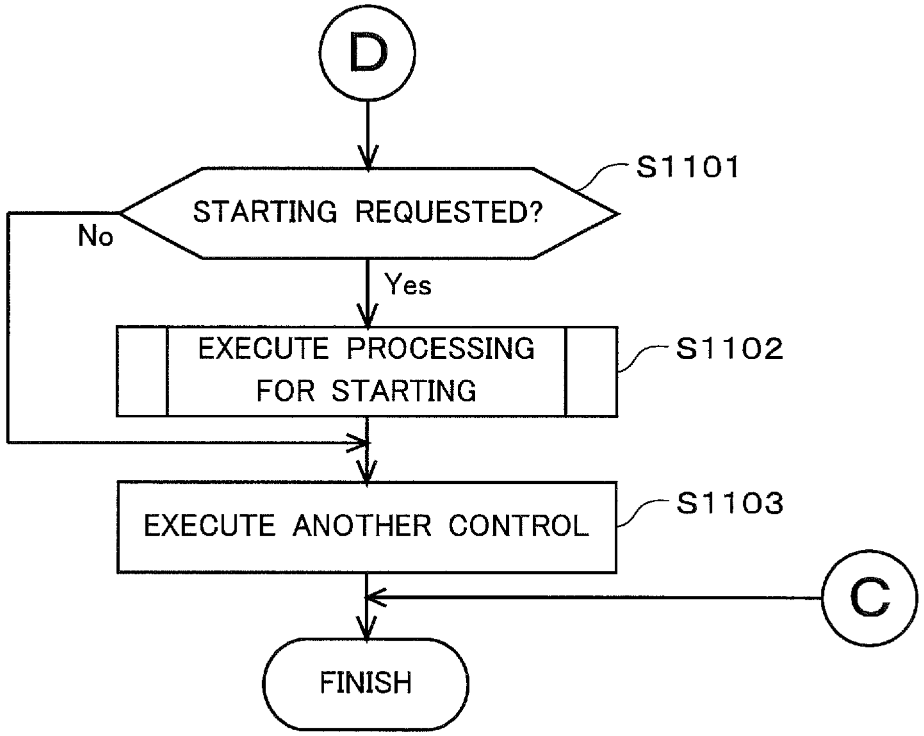
FIG. 11 shows another flowchart of the processing on the center.

After the controller 31 transmits the login information, the center 30 obtains the position information from the vehicle controller 10 (step S1007), and the procedure moves to the next step (D in FIG. 10). The position information obtained at this step is the more accurate position information, either the position information at the time of parking start or the position information at the time of login.

Next, the information judging part 31*a* judges whether the received data include the request for starting (step S1101). When the information judging part 31*a* judges that the received data include the request for starting (Yes at the step S1101), the controller 31 executes the processing for starting (step S1102). The processing for starting is detailed later. When the information judging part 31*a* judges that the received data do not include the request for starting (No at the step S1101), the procedure moves to the next step without execution of the processing for starting.

Next, the controller 31 executes another control (step S1103). Concretely, the information judging part 31*a* first judges whether the received data include another request. When the information judging part 31*a* judges that the received data include another request, the controller 31 executes the processing corresponding to the request. When the information judging part 31*a* judges that the received data do not include another request, the controller 31 does not execute any other processing. Then, the processing for remote starting on the center 30 is finished.

Figure 12:
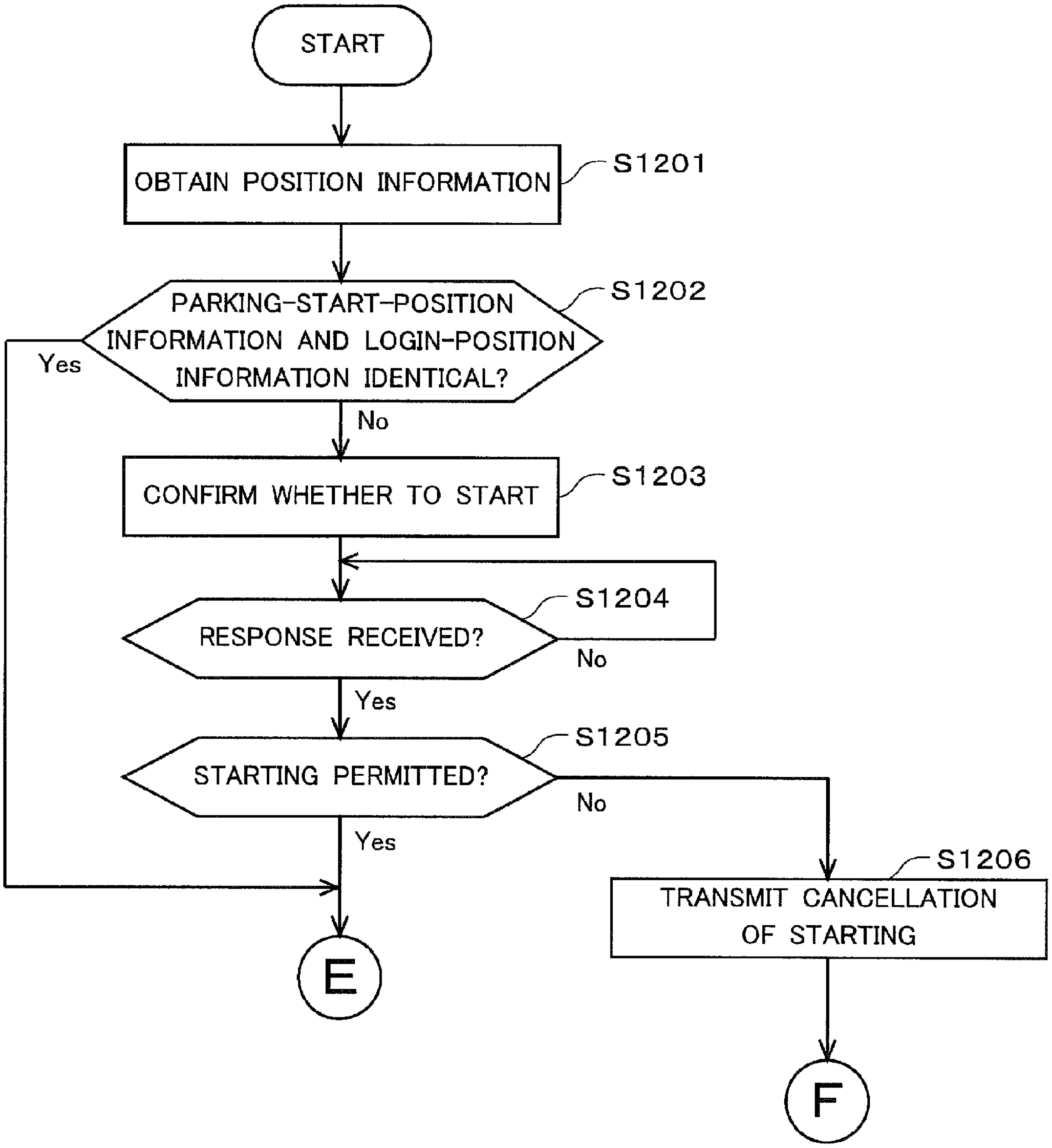
FIG. 12 shows another flowchart of the processing on the center.
Figure 13:
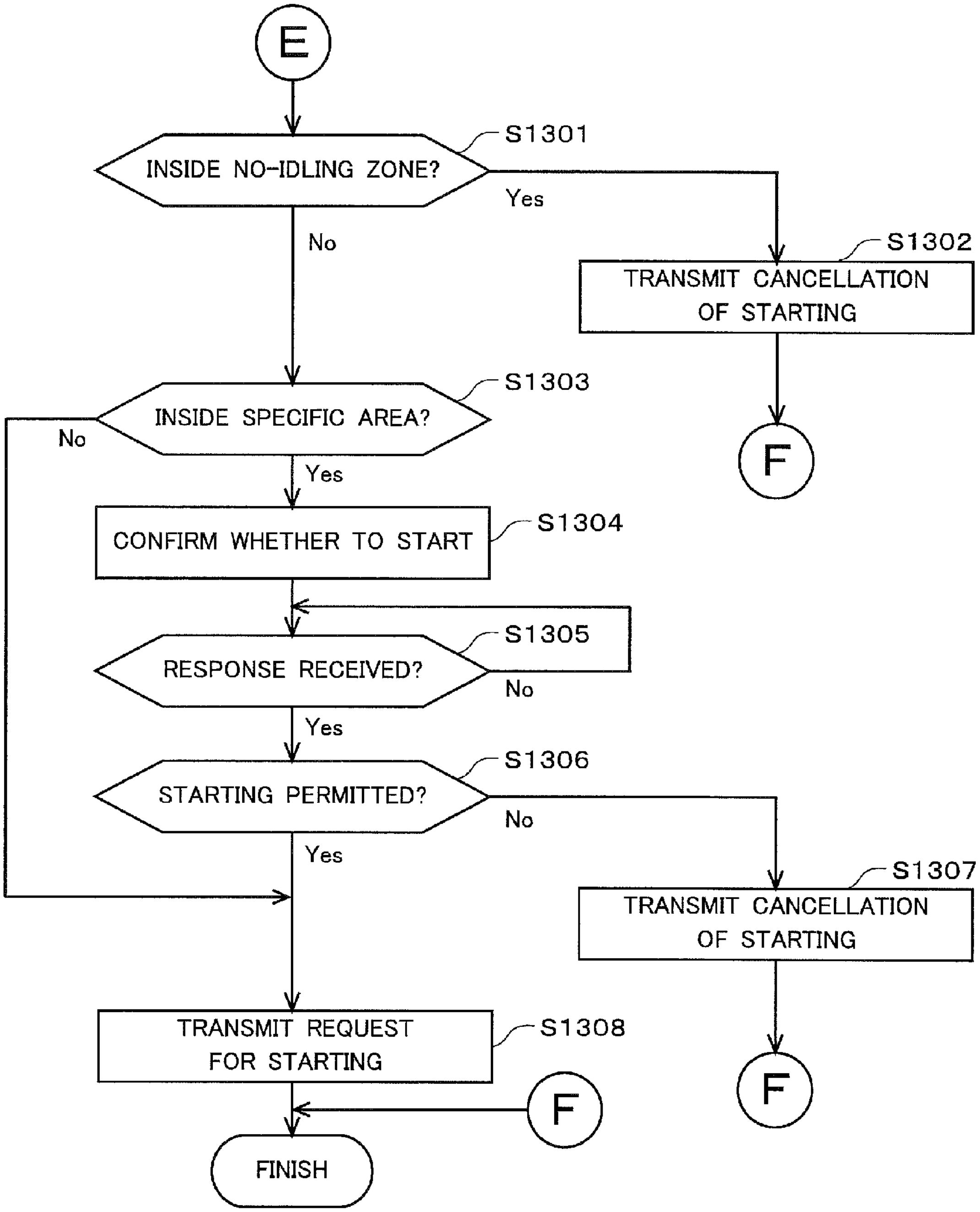
FIG. 13 shows another flowchart of the processing on the center.

The processing for starting executed by the controller 31 (step S1102) is described next. Each of FIG. 12 and FIG. 13 shows the flowchart of the processing for starting executed by the controller 31.

In the processing for starting, the controller 31 starts with obtaining the position information transmitted by the vehicle controller 10 via the communicator 32 (step S1201). The position information received at this step is the position information at the time of request for starting.

Next, the starting restricting part 31*b* judges whether the position information at the time of parking start stored at the step S1003 and the position information at the time of login received at the step S1007 are identical (step S1202). Concretely, the starting restricting part 31*b* compares the position information at the time of parking start stored in the memory 33 and the position information received at the time of login, and judges whether there is any difference between the two. The starting restricting part 31*b* judges that there is no difference not only when the two of the position information are completely identical, but also when the distance between the two is shorter than a prescribed distance.

When the position information received at the time of login is identical to the position information at the time of parking start, the starting restricting part 31*b* judges that the positions are identical. When the position information at the time of login is different from the position information at the time of parking start, or when either of them corresponds to the undetermined-information, the starting restricting part 31*b* judges that the positions are different. When both of the position information at the time of parking start and the position information at the time of login correspond to the undetermined-information, the starting restricting part 31*b* judges that the positions are identical. In the case where the position information at the time of parking start is received when an application is logged in because the position information received at the time of login is less accurate, the starting restricting part 31*b* judges that the positions are identical.

Then, the starting restricting part 31*b* reads out the restriction conditions included in the setting information stored in the memory 33, and compares the difference between the positions and the read-out restriction conditions. In the embodiment, in terms of the restriction conditions, when the positions are identical, the remote starting is permitted; when the positions are different, confirmation on whether to continue the processing for starting is required.

The starting restricting part 31*b* judges that the two positions are identical as a result of the comparison (Yes at the step S1202), the procedure moves to the next step (E in FIG. 12). The judgment that the positions are identical indicates that the current vehicle position is identical to the vehicle position at the time of parking start. The judgment is made on the basis that the vehicle stays without moving against user's will.

When the starting restricting part 31*b* judges that the two positions are different (No at the step S1202), the procedure of the controller 31 moves to the step for confirming whether to continue the processing for starting (step S1203). Concretely, the controller 31 transmits to the mobile terminal 20 via the communicator 32 the information indicating that the vehicle position at the time of login is different from the vehicle position at the time of parking start, and the inquiry information for confirming whether to continue the processing for starting. The judgment that the two positions are different indicates that the current vehicle position is different from the vehicle position at the time of parking start. It is assumed that the vehicle has been moved against user's will such as by theft or tow-away.

Then, the controller 31 monitors whether the response to the inquiry has been received from the mobile terminal 20 (step S1204). When judging that the response has not been received from the mobile terminal 20 (No at the step S1204), the controller 31 repeats the step for monitoring until the response has been received. When judging that the response has been received from the mobile terminal 20 (Yes at the step S1204), the controller 31 judges whether the details of the response indicate permission to continue the processing for starting (step S1205).

When the controller 31 judges that the details of the response from the mobile terminal 20 indicate permission to continue the processing for starting (Yes at the step S1205), the procedure moves to the next step (E in FIG. 12). When judging that the details of the response from the mobile terminal 20 indicate non-permission to continue the processing for starting (No at the step S1205), the controller 31 cancels the processing for starting and transmits the data indicating the cancellation to the mobile terminal 20 (step S1206), and the processing for remote starting is finished (F in FIG. 12).

When judging that the two positions are different, the controller 31 may cancel the processing for starting without execution of the processing for confirming whether to continue the processing for starting. In this case also, the controller 31 executes the processing for transmitting to the mobile terminal 20 the information indicating that the processing for starting has been cancelled. That is, when No is obtained at the step S1202, the procedure moves to the step S1206.

Next, the position judging part 31*c* judges whether the vehicle is in the no-idling zone (step S1301). As described above, the no-idling zones are included in the map information 33*c* stored in the memory 33. The position judging part 31*c* reads out the position information at the time of login included in the position information 33*b*, and the no-idling zones included in the map information 33*c*. Then the position judging part 31*c* judges whether the vehicle is parked in the no-idling zone by comparing the position information at the time of login and the no-idling zones. The position information to be compared at this step may be the position information at the time of parking start. When the position judging part 31*c* judges that the vehicle is parked in the no-idling zone (Yes at the step S1301), since no vehicle is allowed to be kept in the idling condition by the remote starting, the controller 31 cancels the processing for starting without confirming with the mobile terminal 20 on whether to start the driving apparatus, and transmits the information indicating the cancellation to the mobile terminal 20 (step S1302), and the processing for remote starting is finished (F in FIG. 13).

When judging that the vehicle is not parked in the no-idling zone (No at the step S1301), the position judging part 31*c* judges whether the vehicle is parked in the specific area (step S1303). Concretely, the position judging part 31*c* reads out the position information at the time of login included in the position information 33*b*, and the specific areas included in the map information 33*c*. Then, the position judging part 31*c* judges whether the vehicle is parked in the specific area by comparing the position information at the time of login and the specific areas. The position information to be compared at this step may also be the position information at the time of parking start.

When the position judging part 31*c* judges that the vehicle is not parked in the specific area (No at the step S1303), the starting directing part 31*d* transmits the request for starting to the vehicle controller 10 (step S1308), and the processing for remote starting is finished. When the position judging part 31*c* judges that the vehicle is parked in the specific area (Yes at the step S1303), the procedure of the controller 31 moves to the step of the processing for confirming whether to continue the processing for starting (step S1304). Concretely, the controller 31 transmits to the mobile terminal 20 via the communicator 32 the information indicating that the vehicle is parked in the specific area, and the inquiry information for confirmation on whether to continue the processing for starting.

Then, the controller 31 monitors whether the response to the inquiry has been received from the mobile terminal 20 (step S1305). When judging that the response has not been received from the mobile terminal 20 (No at the step S1305), the controller 31 repeats the step for the monitoring until the response has been received. When judging that the response has been received from the mobile terminal 20 (Yes at the step S1305), the controller 31 judges whether the details of the response indicate permission to continue the processing for starting (step S1306).

When the controller 31 judges that the details of the response from the mobile terminal 20 indicate the permission to continue the processing for starting (Yes at the step S1306), the starting directing part 31*d* transmits the request for starting to the vehicle controller 10 (step S1308), and the processing for remote starting is finished. When judging that the details of the response from the mobile terminal 20 indicate the non-permission to continue the processing for starting (No at the step S1306), the controller 31 cancels the processing for starting and transmits the information indicating the cancellation to the mobile terminal 20 (step S1307), and the processing for remote starting is finished (F in FIG. 13).

When the position judging part 31*c* judges that the vehicle is parked in the specific area, the controller 31 may cancel the processing for starting without confirming whether to continue the processing for starting. In this case also, the controller 31 executes the processing for transmitting to the mobile terminal 20 the information indicating that the processing for starting has been cancelled. That is, when Yes is obtained at the step S1303, the procedure moves to the step S1307.

When all of the necessary data have been transmitted and received between the center 30 and the vehicle controller 10, the center 30 automatically terminates the communication with the vehicle controller 10.

Further, in the embodiment described above, the information of the ignition switch being turned off is used as the parking start information. When the ignition switch is turned off, it is judged that parking has started, and the position information is transmitted to the center. However, making the judgment on the parking start is not limited to this case. Other kinds of the vehicle information are acceptable as long as the information helps to make the judgment on the parking start. In an example on the vehicle with the engine used as the driving apparatus, the judgment that parking has started may be made based on the engine revolution indicating that the engine has stopped. In another example on the vehicle equipped with a keyless entry apparatus, the judgment that parking has started may be made based on the information indicating that doors have been locked by the keyless entry apparatus. The point is just transmitting the position information after judging that parking has started.

In the embodiment described above, upon reception of the login information for an application transmitted to the vehicle controller 10 as control information from the center 30, the vehicle controller 10 transmits more accurate position information. However, the configuration is not limited to this. In an example, when the vehicle controller 10 receives the request for starting as the control information from the center 30, the controller 11 may wake up from the sleep mode, and may transmit to the center 30 the more accurate position information. This modification may be adopted in other embodiments as well.

<2. Second Embodiment>

Next, the second embodiment is described. In the configuration of the first embodiment, the vehicle controller 10 obtains the position information at the time of parking start and the position information at the time of login for comparison, and transmits the more accurate position information to the center 30. In another configuration, when receiving the login information, the vehicle controller 10 may transmit to the center 30 the position information stored in the memory 14 without obtaining the position information at the time of login. Since it is highly possible that the position information obtained at the time of login is less accurate, the processing for obtaining and the processing for comparison are omitted, and the position information stored in the memory 14 is transmitted. This enables effective processing and transmission of the position information that is prospectively more accurate. Therefore, in the second embodiment, the configuration where a vehicle controller transmits the stored position information without obtaining the position information at the time of login is described.

<2-1. Outline of System>

A vehicle control system of the second embodiment has the same configuration as the vehicle control system shown in FIG. 1. The configuration of a mobile terminal and the configuration of a center in the second embodiment are the same as those of the first embodiment. In the second embodiment, a part of the configuration of a vehicle controller and a part of the processing of the vehicle controller and the center are different from those of the first embodiment. The different points from the first embodiment are mainly described hereinafter.

<2-2. Configuration of Vehicle Controller>

First, the configuration of a vehicle controller 15 of the second embodiment is described. The vehicle controller 15 has the same major configuration as the vehicle controller 10 of the first embodiment. That is, the vehicle controller 15 includes a controller 11, a position information obtaining part 12, a communicator 13 and a memory 14. Among them, each of the position information obtaining part 12, the communicator 13 and the memory 14 is the same configuration as that of the first embodiment. However, the configuration of the controller 11 is partially different.

Concretely, the controller 11 of the second embodiment does not include the transmission judging part 11*f* included in the controller 11 of the first embodiment, which is different from the first embodiment. This is because, on the vehicle controller 15 that is configured to transmit to a center 30 the position information stored in the memory 14 without obtaining new position information, the accuracy of the position information is not compared for decision of the position information to be transmitted. The controller 11 includes 11*a*, 11*b*, 11*c*, 11*d* and 11*e*, each of which has the same configuration as that of the first embodiment, and executes the same processing.

<2-3. Processing on Vehicle Controller>

Next, the processing on the vehicle controller 15 is described. The processing on the vehicle controller 15 of the second embodiment is also basically the same as the processing on the vehicle controller 10 of the first embodiment. The different points from the first embodiment are mainly described hereinafter.

First, the vehicle controller 15 executes the same procedure as the first embodiment, from the step S501 to the step S506. In the second embodiment, new position information is not obtained when the login information is received. Thus, the controller 11 executes the processing for transmitting the position information (step S601) without execution of the step S507.

The position information to be transmitted at this step is the position information at the time of parking start which is stored in the memory 14 and which has been repeatedly obtained at the steps from the step S502 to the step S504 while the ignition switch has been in the off-state. Just after the controller 11 has woken up from the sleep mode, the position information obtaining part 12 also wakes up but often behaves erratically. The position information obtained in such a case is less accurate and less reliable. Therefore in the second embodiment, the vehicle controller 15 transmits the highly-reliable position information that has been obtained so far, without obtaining the position information just after waking up and without comparing the accuracy.

The vehicle controller 15 executes the same procedure as the first embodiment, from the step S602 to the step S606, and the processing is finished. As above, in the embodiment, the vehicle controller 15 transmits the stored position information without obtaining the position information while the controller 11 behaves erratically just after waking up, which enables reduction of processing load on the vehicle controller 15, and besides enables transmission of the highly-reliable position information.

<2-4. Processing on Center>

Next, the processing on the center 30 is described. The processing on the center 30 of the second embodiment is also basically the same as the processing on the center 30 of the first embodiment. The different points from the first embodiment are mainly described hereinafter.

The center 30 executes the same procedure as the first embodiment, from the step S1001 to the step S1007, and also the same procedure, from the step S1101 to the step S1103. However, in the second embodiment, the position information received at the step S1007 is not the position information newly obtained by the vehicle controller 15 at the time of login, but the position information stored in the memory 14. Thus, the processing for starting at the step S1102 is partially different.

Therefore, the processing for starting (step S1102) of the second embodiment is described. The center 30 first executes the same step as the step S1201 of the first embodiment, and then the same steps, from the step S1301 to the step S1308. That is, the center 30 does not execute the steps, from the step S1202 to the step S1206. This is because there is no need to judge the difference between the position information at the time of parking start and the position information at the time of login since the two of the position information are identical.

As above, in the second embodiment, the center 30 executes the processing for starting without making a judgment on starting based on a control condition because the center 30 does not obtain the position information at the time of login.

Described so far is the configuration where the accuracy of the obtained position information and the accuracy of the position information stored in the memory 14 are compared, and the more accurate position information is stored in the memory 14 in the processing for obtaining the position information since the ignition switch is turned off until the controller 11 turns into the sleep mode. However, other configuration is adoptable.

As an adoptable configuration, the position information obtained at the same time when the ignition switch is turned off may be stored in the memory 14 as the position information at the time of parking start. In another configuration, the controller 11 may compare the accuracy just before turning into the sleep mode among all of the stored position information that have been obtained until turning into the sleep mode, and may store the most accurate position information.

In each of the embodiments described above, the vehicle control system adopting the remote-start application is described. However, other applications such as a vehicle-position-display application are adoptable in the system. In such a case also, the processing on the vehicle controller 10 for obtaining the position information and the processing for transmitting the position information to the center 30 are the same as each of the embodiments.

Further, in each of the embodiments described above, various functions are executed by software, specifically by CPU processing based on programs. However, some of these functions may be executed by electrical hardware circuits. Contrarily, some of the functions executed through hardware circuits in the above descriptions may be executed through software. Each of the processing described in the embodiments can be arbitrarily combined.

On the vehicle controller of the invention, the position information obtaining part periodically obtains position information for a prescribed period of time since parking start of the vehicle.

On the vehicle controller of the invention, the most accurate position information among the plurality of position information that have been periodically obtained is treated as the position information at the time of parking start.

The vehicle controller of the invention further includes a memory that stores the position information, wherein the controller compares the accuracy of the position information obtained this time and the accuracy of the position information previously obtained, and stores in the memory the more accurate position information as the position information at the time of parking start.

On the vehicle controller of the invention, when receiving the control information, the controller compares the accuracy of the position information at the time of parking start stored in the memory and the accuracy of the position information at the time of reception of the control information.

The vehicle control method in the invention includes the steps of: (a) obtaining position information at a time of parking start upon parking start of a vehicle; (b) obtaining position information at a time of reception of control information when a controller that is installed in the vehicle receives the control information from an information processor that is located outside the vehicle while the controller is in a sleep mode; and (c) transmitting to the information processor one of the position information at the time of parking start and the position information at the time of reception of the control information, which is more accurate, when the position information at the time of reception of the control information is obtained.

The vehicle control method in the invention includes the steps of: (a) obtaining position information at a time of parking start upon parking start of the vehicle; and (b) transmitting the position information at the time of parking start to an information processor that is located outside the vehicle when a controller that is installed in the vehicle receives control information from the information processor while the controller is in a sleep mode.

Further, in the invention, the more accurate position information can be obtained. While the invention has been shown and described in detail, the foregoing description is in all aspects illustrative and not restrictive. It is therefore understood that numerous other modifications and variations can be devised without departing from the scope of the invention.

What is claimed is:

1. A vehicle controller that is installed in a vehicle and that controls one or more operations of the vehicle, the vehicle controller comprising:

a communicator that communicates with an information processor that is located outside the vehicle by transmitting and receiving information;

a controller that controls the vehicle controller based on control information transmitted from the information processor; and a position-information-obtaining-part that obtains position information of the vehicle, wherein the position-information-obtaining-part (i) obtains position information at a time of parking start before the controller moves into a sleep mode after the parking start of the vehicle, (ii) obtains position information at a time of reception of the control information when the controller receives the control information that triggers waking the controller up from the sleep mode, from the information processor while the controller is in the sleep mode, and (iii) derives accuracy information of the position information obtained at (i) and (ii) by determining a distance error in a positioning measurement of the position information, and when the position-information-obtaining-part obtains the position information at the time of reception of the control information, the communicator transmits a more accurate one of (a) the position information at the time of parking start and (b) the position information at the time of reception of the control information based on the derived accuracy information.

2. The vehicle controller of claim 1, wherein:

the position-information-obtaining-part periodically obtains the position information until a prescribed period of time elapses since the parking start of the vehicle.

3. The vehicle controller of claim 2, wherein:

the position information that is most accurate among the plurality of the position information periodically obtained, based on the derived accuracy information, is treated as the position information at the time of parking start.

4. The vehicle controller of claim 3, further comprising:

a memory that stores the position information, wherein the controller compares accuracy of the position information newly obtained and accuracy of the position information previously obtained, and stores in the memory the position information that is more accurate, based on the derived accuracy information, as the position information at the time of parking start.

5. The vehicle controller of claim 4, wherein:

when receiving the control information, the controller compares the accuracy of the position information at the time of parking start stored in the memory and the accuracy of the position information at the time of reception of the control information.

6. A vehicle controller that is installed in a vehicle and that controls one or more operations of the vehicle, the vehicle controller comprising:

a communicator that communicates with an information processor that is located outside the vehicle by transmitting and receiving information;

a controller that controls the vehicle controller based on control information transmitted from the information processor; and a position-information-obtaining-part that obtains position information of the vehicle, wherein:

the position-information-obtaining-part obtains position information at a time of parking start before the controller moves into a sleep mode after the parking start of the vehicle, and the communicator transmits the position information at the time of parking start, immediately after the controller exits the sleep mode, to the information processor when the controller receives the control information that trigger waking the controller up from the sleep mode, from the information processor while the controller is in the sleep mode.

7. The vehicle controller of claim 6, wherein:

the position-information-obtaining-part periodically obtains the position information until a prescribed period of time elapses since the parking start of the vehicle.

8. The vehicle controller of claim 7, wherein:

the position-information-obtaining-part derives accuracy information of the periodically obtained position information and the position information that is most accurate among the plurality of the position information periodically obtained, based on the derived accuracy information, is treated as the position information at the time of parking start.

9. The vehicle controller of claim 8, further comprising:

a memory that stores the position information, wherein:

the controller compares accuracy of the position information newly obtained and accuracy of the position information previously obtained, and stores in the memory the position information that is more accurate, based on the derived accuracy information, as the position information at the time of parking start.

10. A vehicle control method for controlling a vehicle, the method performed by a vehicle controller installed in the vehicle and comprising the steps of:

(a) obtaining position information of the vehicle at a time of parking start before a controller of the vehicle controller that is installed in the vehicle moves into a sleep mode after the parking start of the vehicle;

(b) obtaining position information of the vehicle at a time of reception of control information when the controller receives the control information that triggers waking the controller up from the sleep mode, from an information processor that is located outside the vehicle while the controller is in the sleep mode;

(c) deriving accuracy information of the position information obtained at (a) and (b) by determining a distance error in a positioning measurement of the position information; and (d) transmitting to the information processor a more accurate one of (i) the position information at the time of parking start and (ii) the position information at the time of reception of the control information, based on the derived accuracy information, when the position information at the time of reception of the control information is obtained.

11. A vehicle control method for controlling a vehicle, the method performed by a vehicle controller installed in the vehicle, the method comprising:

(a) obtaining position information of the vehicle at a time of parking start before a controller of the vehicle controller that is installed in the vehicle moves into a sleep mode after the parking start of the vehicle; and (b) transmitting the position information at the time of parking start, immediately after the controller exits the sleep mode, to an information processor that is located outside the vehicle when the controller receives control information that triggers waking the controller up from the sleep mode, from the information processor while the controller is in the sleep mode.

* * * * *